United States Patent
Reynar et al.

(10) Patent No.: US 7,788,602 B2
(45) Date of Patent: Aug. 31, 2010

(54) METHOD AND SYSTEM FOR PROVIDING RESTRICTED ACTIONS FOR RECOGNIZED SEMANTIC CATEGORIES

(75) Inventors: Jeff Reynar, Woodinville, WA (US); Ziyi Wang, Redmond, WA (US); Michael Ammerlaan, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 222 days.

(21) Appl. No.: 09/906,552

(22) Filed: Jul. 16, 2001

(65) Prior Publication Data
US 2002/0087591 A1    Jul. 4, 2002

Related U.S. Application Data

(63) Continuation-in-part of application No. 09/588,411, filed on Jun. 6, 2000.

(51) Int. Cl.
*G06F 3/048* (2006.01)
(52) U.S. Cl. .................................. 715/825; 715/739
(58) Field of Classification Search ................. 345/411, 345/968; 707/1; 715/811, 968, 825, 739, 715/826
See application file for complete search history.

(56) References Cited

U.S. PATENT DOCUMENTS

| | | | |
|---|---|---|---|
| 4,674,065 A | 6/1987 | Lange et al. | 364/900 |
| 4,868,750 A | 9/1989 | Kucera et al. | 711/2 |
| 5,020,019 A | 5/1991 | Ogawa | 364/900 |
| 5,128,865 A | 7/1992 | Sadler | 704/2 |
| 5,159,552 A | 10/1992 | van Gasteren et al. | 704/1 |
| 5,267,155 A | 11/1993 | Buchanan et al. | 364/419.14 |
| 5,287,448 A | 2/1994 | Nicol et al. | 715/707 |
| 5,297,039 A | 3/1994 | Kanaegami et al. | 707/5 |
| 5,317,546 A | 5/1994 | Balch et al. | 368/9 |
| 5,337,233 A | 8/1994 | Hofert et al. | 364/419.14 |
| 5,341,293 A | 8/1994 | Vertelney et al. | 715/530 |

(Continued)

FOREIGN PATENT DOCUMENTS

CA    2 246 920 A1    3/2000

(Continued)

OTHER PUBLICATIONS

Microsoft, Microsoft Computer Dictionary, Microsoft Press, Fifth Edition, p. 409, 2002.*

(Continued)

*Primary Examiner*—Dennis Bonshock
(74) *Attorney, Agent, or Firm*—Merchant & Gould

(57) ABSTRACT

Strings are recognized and annotated, or labeled, with a type label by a recognizer plug-in. Application program modules may use the type label and other metadata to provide users with a choice of electronic commerce actions. In addition, the user may be provided with a download Uniform Resource Locator (URL) and download action plug-ins for that type label. An ActionGUID may be used to specify the class ids (CLSIDs) of the action plug-ins that may provide actions for a particular semantic category type label. Each DLL has a class id (CLSID), which is a GUID. The ActionGUID is a GUID that is specified by the recognizer plug-in and which corresponds to the CLSID(s) of the only action plug-ins that should be permitted to provide actions for the semantic category type label provided by the recognizer plug-in.

11 Claims, 6 Drawing Sheets

U.S. PATENT DOCUMENTS

| | | | |
|---|---|---|---|
| 5,351,190 A | 9/1994 | Kondo | 364/419.08 |
| 5,386,564 A | 1/1995 | Shearer et al. | 395/650 |
| 5,392,386 A | 2/1995 | Chalas | 395/155 |
| 5,418,902 A | 5/1995 | West et al. | 715/503 |
| 5,446,891 A | 8/1995 | Kaplan et al. | 395/600 |
| 5,522,089 A | 5/1996 | Kikinis et al. | 710/73 |
| 5,535,323 A | 7/1996 | Miller et al. | 715/707 |
| 5,541,836 A | 7/1996 | Church et al. | 704/7 |
| 5,546,521 A | 8/1996 | Martinez | 715/711 |
| 5,581,684 A | 12/1996 | Dudzik et al. | 715/708 |
| 5,596,700 A | 1/1997 | Darnell et al. | 715/512 |
| 5,617,565 A | 4/1997 | Augenbraun et al. | 395/604 |
| 5,625,783 A | 4/1997 | Ezekiel et al. | 395/352 |
| 5,627,567 A | 5/1997 | Davidson | 345/173 |
| 5,627,958 A | 5/1997 | Potts et al. | 715/708 |
| 5,634,019 A | 5/1997 | Koppolu et al. | 715/744 |
| 5,640,560 A | 6/1997 | Smith | 395/615 |
| 5,657,259 A | 8/1997 | Davis et al. | 364/715.03 |
| 5,685,000 A | 11/1997 | Cox | 704/9 |
| 5,708,825 A | 1/1998 | Sotomayor | 395/762 |
| 5,715,415 A | 2/1998 | Dazey et al. | 715/708 |
| 5,717,923 A | 2/1998 | Dedrick | 395/613 |
| 5,752,022 A | 5/1998 | Chiu et al. | 395/610 |
| 5,761,689 A | 6/1998 | Rayson et al. | 707/533 |
| 5,764,794 A | 6/1998 | Perlin | 382/186 |
| 5,765,156 A | 6/1998 | Guzak et al. | 707/100 |
| 5,781,189 A | 7/1998 | Holleran et al. | 715/826 |
| 5,781,904 A * | 7/1998 | Oren et al. | 707/100 |
| 5,794,257 A | 8/1998 | Liu et al. | 707/501 |
| 5,799,068 A | 8/1998 | Kikinis et al. | 379/93.06 |
| 5,802,253 A | 9/1998 | Gross et al. | 395/51 |
| 5,802,262 A | 9/1998 | Van De Vanter | 395/180 |
| 5,802,299 A | 9/1998 | Logan et al. | 395/200.48 |
| 5,802,530 A | 9/1998 | van Hoff | 707/513 |
| 5,805,911 A | 9/1998 | Miller | 395/796 |
| 5,809,318 A | 9/1998 | Rivette et al. | 715/512 |
| 5,815,830 A | 9/1998 | Anthony | 707/6 |
| 5,818,447 A | 10/1998 | Wolf et al. | 715/752 |
| 5,821,931 A | 10/1998 | Berquist et al. | 715/784 |
| 5,822,539 A | 10/1998 | van Hoff | 395/200.66 |
| 5,822,720 A | 10/1998 | Bookman et al. | 704/3 |
| 5,826,025 A | 10/1998 | Gramlich | 395/200.47 |
| 5,832,100 A | 11/1998 | Lawton et al. | 382/100 |
| 5,845,077 A | 12/1998 | Fawcett | 709/221 |
| 5,855,007 A | 12/1998 | Jovicic et al. | 705/14 |
| 5,859,636 A * | 1/1999 | Pandit | 715/501.1 |
| 5,872,973 A | 2/1999 | Mitchell et al. | 395/685 |
| 5,875,443 A | 2/1999 | Nielsen | 707/2 |
| 5,877,757 A | 3/1999 | Baldwin et al. | 715/705 |
| 5,884,266 A | 3/1999 | Dvorak | 704/270.1 |
| 5,892,919 A | 4/1999 | Nielsen | 395/200.58 |
| 5,893,073 A | 4/1999 | Kasso et al. | 705/8 |
| 5,893,132 A | 4/1999 | Huffman et al. | 715/201 |
| 5,895,461 A | 4/1999 | De La Huerga et al. | 707/1 |
| 5,896,321 A | 4/1999 | Miller et al. | 365/189.01 |
| 5,900,004 A | 5/1999 | Gipson | |
| 5,907,852 A | 5/1999 | Yamada | 715/541 |
| 5,913,214 A | 6/1999 | Madnick et al. | 707/10 |
| 5,920,859 A * | 7/1999 | Li | 707/5 |
| 5,924,099 A | 7/1999 | Guzak et al. | 707/100 |
| 5,933,139 A | 8/1999 | Feigner et al. | 715/708 |
| 5,933,140 A | 8/1999 | Strahorn et al. | 715/712 |
| 5,933,498 A | 8/1999 | Schneck et al. | 705/54 |
| 5,940,614 A | 8/1999 | Allen et al. | 717/120 |
| 5,944,787 A | 8/1999 | Zoken | 709/206 |
| 5,946,647 A | 8/1999 | Miller et al. | 704/9 |
| 5,948,061 A | 9/1999 | Merriman et al. | 709/219 |
| 5,956,681 A | 9/1999 | Yamakita | 704/260 |
| 5,974,413 A | 10/1999 | Beauregard et al. | |
| 5,987,480 A | 11/1999 | Donohue et al. | 715/501.1 |
| 5,991,719 A | 11/1999 | Yazaki et al. | 704/251 |
| 5,995,756 A | 11/1999 | Herrmann | 395/712 |
| 6,006,265 A | 12/1999 | Rangan et al. | 709/226 |
| 6,006,279 A | 12/1999 | Hayes | 719/328 |
| 6,014,616 A | 1/2000 | Kim | 704/8 |
| 6,018,761 A | 1/2000 | Uomini | 706/206 |
| 6,028,605 A * | 2/2000 | Conrad et al. | 345/840 |
| 6,029,135 A | 2/2000 | Krasle | 704/275 |
| 6,029,171 A | 2/2000 | Smiga et al. | 707/102 |
| 6,031,525 A | 2/2000 | Perlin | 345/173 |
| 6,052,531 A | 4/2000 | Waldin et al. | 717/170 |
| 6,061,516 A | 5/2000 | Yoshikawa et al. | 717/109 |
| 6,067,087 A | 5/2000 | Krauss et al. | 715/762 |
| 6,072,475 A | 6/2000 | Van Ketwich | 345/173 |
| 6,073,090 A | 6/2000 | Fortune et al. | 704/8 |
| 6,085,201 A | 7/2000 | Tso | 707/505 |
| 6,088,711 A | 7/2000 | Fein et al. | 715/523 |
| 6,092,074 A | 7/2000 | Rodkin et al. | 707/102 |
| 6,108,640 A | 8/2000 | Slotznick | 705/26 |
| 6,108,674 A | 8/2000 | Murakami et al. | 707/515 |
| 6,112,209 A | 8/2000 | Gusack | 707/101 |
| 6,121,968 A | 9/2000 | Arcuri et al. | 345/352 |
| 6,122,647 A * | 9/2000 | Horowitz et al. | 715/513 |
| 6,126,306 A | 10/2000 | Ando | 364/419.02 |
| 6,137,911 A | 10/2000 | Zhilyaev | 382/225 |
| 6,141,005 A | 10/2000 | Hetherington et al. | 715/866 |
| 6,151,643 A | 11/2000 | Cheng et al. | 710/36 |
| 6,154,738 A | 11/2000 | Call | 707/4 |
| 6,167,469 A | 12/2000 | Safai et al. | 710/62 |
| 6,167,523 A | 12/2000 | Strong | 726/21 |
| 6,167,568 A | 12/2000 | Gandel et al. | 717/176 |
| 6,173,316 B1 | 1/2001 | De Boor et al. | 709/218 |
| 6,182,029 B1 | 1/2001 | Friedman | 704/9 |
| 6,185,550 B1 | 2/2001 | Snow et al. | 707/1 |
| 6,185,576 B1 | 2/2001 | McIntosh | 707/200 |
| 6,199,046 B1 | 3/2001 | Heinzle et al. | 705/1 |
| 6,199,081 B1 | 3/2001 | Meyerzon et al. | 715/513 |
| 6,208,338 B1 | 3/2001 | Fischer et al. | 715/705 |
| 6,219,698 B1 | 4/2001 | Iannucci et al. | 709/221 |
| 6,246,404 B1 | 6/2001 | Feigner et al. | 715/708 |
| 6,272,074 B1 | 8/2001 | Winner | 368/10 |
| 6,272,505 B1 | 8/2001 | De La Huerga | 707/501 |
| 6,282,489 B1 | 8/2001 | Bellesfield et al. | 701/201 |
| 6,291,785 B1 | 9/2001 | Koga et al. | 209/584 |
| 6,292,768 B1 | 9/2001 | Chan | 704/1 |
| 6,295,061 B1 | 9/2001 | Park et al. | 715/764 |
| 6,297,822 B1 | 10/2001 | Feldman | 715/705 |
| 6,300,950 B1 | 10/2001 | Clark et al. | 715/705 |
| 6,308,171 B1 | 10/2001 | De La Huerga | 707/3 |
| 6,311,152 B1 | 10/2001 | Bai et al. | 704/9 |
| 6,311,177 B1 * | 10/2001 | Dauerer et al. | 707/2 |
| 6,311,194 B1 | 10/2001 | Sheth et al. | 707/505 |
| 6,320,496 B1 | 11/2001 | Sokoler et al. | 340/470.1 |
| 6,323,853 B1 | 11/2001 | Hedloy | 345/339 |
| 6,336,125 B2 | 1/2002 | Noda et al. | 715/531 |
| 6,336,131 B1 | 1/2002 | Wolfe et al. | 709/203 |
| 6,338,059 B1 * | 1/2002 | Fields et al. | 707/4 |
| 6,339,436 B1 | 1/2002 | Amro et al. | 715/714 |
| 6,339,755 B1 | 1/2002 | Hetherington et al. | 704/8 |
| 6,347,398 B1 | 2/2002 | Parthasarathy et al. | 717/170 |
| 6,349,295 B1 | 2/2002 | Tedesco et al. | 707/3 |
| 6,353,926 B1 | 3/2002 | Parthesarathy et al. | 717/11 |
| 6,381,742 B2 | 4/2002 | Forbes et al. | 717/176 |
| 6,382,350 B1 | 5/2002 | Jezewski et al. | 181/290 |
| 6,392,668 B1 | 5/2002 | Murray | 715/38 |
| 6,396,515 B1 | 5/2002 | Hetherington et al. | 715/762 |
| 6,401,067 B2 | 6/2002 | Lewis et al. | 704/275 |
| 6,408,323 B1 | 6/2002 | Kobayashi et al. | 709/100 |
| 6,413,100 B1 | 7/2002 | Dickmeyer et al. | 434/322 |
| 6,415,304 B1 | 7/2002 | Horvitz | 715/205 |
| 6,421,678 B2 | 7/2002 | Smiga et al. | 707/102 |
| 6,424,979 B1 | 7/2002 | Livingston et al. | 715/511 |
| 6,434,567 B1 | 8/2002 | De La Huerga | 707/102 |
| 6,438,545 B1 | 8/2002 | Beauregard et al. | |

| Patent No. | Date | Inventor | Class |
|---|---|---|---|
| 6,441,753 B1 | 8/2002 | Montgomery | 341/34 |
| 6,442,545 B1 | 8/2002 | Feldman et al. | 707/8 |
| 6,442,591 B1 | 8/2002 | Haynes et al. | 709/206 |
| 6,456,304 B1 | 9/2002 | Anguilo et al. | 715/779 |
| 6,470,091 B2 | 10/2002 | Koga et al. | 382/101 |
| 6,473,069 B1 | 10/2002 | Gerpheide | 345/157 |
| 6,477,510 B1 | 11/2002 | Johnson | 705/30 |
| 6,480,860 B1 | 11/2002 | Monday | 707/102 |
| 6,493,006 B1 | 12/2002 | Gourdol et al. | 345/825 |
| 6,498,982 B2 | 12/2002 | Bellesfield et al. | 701/202 |
| 6,510,504 B2 | 1/2003 | Satyanarayanan | 711/170 |
| 6,516,321 B1 | 2/2003 | De La Huerga | 707/102 |
| 6,519,557 B1 | 2/2003 | Emens et al. | 704/8 |
| 6,519,603 B1 | 2/2003 | Bays et al. | |
| 6,546,433 B1 | 4/2003 | Matheson | 709/318 |
| 6,553,385 B2 | 4/2003 | Johnson et al. | 707/104.1 |
| 6,556,972 B1 | 4/2003 | Bakis et al. | 704/277 |
| 6,556,984 B1 | 4/2003 | Zien | 707/2 |
| 6,564,264 B1 | 5/2003 | Creswell et al. | 709/245 |
| 6,571,241 B1 | 5/2003 | Nosohara | 707/6 |
| 6,571,253 B1 | 5/2003 | Thompson et al. | 707/103 R |
| 6,591,260 B1 | 7/2003 | Schwarzhoff et al. | 707/2 |
| 6,595,342 B1 | 7/2003 | Maritzen et al. | 194/212 |
| 6,601,075 B1 | 7/2003 | Huang et al. | 707/104.1 |
| 6,604,099 B1 | 8/2003 | Chung et al. | 707/3 |
| 6,615,131 B1 | 9/2003 | Rennard et al. | 701/200 |
| 6,618,733 B1 | 9/2003 | White et al. | |
| 6,622,140 B1 | 9/2003 | Kantrowitz | 707/5 |
| 6,623,527 B1 | 9/2003 | Hamzy | 715/513 |
| 6,625,581 B1 | 9/2003 | Perkowski | 705/27 |
| 6,629,079 B1 | 9/2003 | Spiegel et al. | 705/26 |
| 6,631,519 B1 | 10/2003 | Nicholson et al. | 717/169 |
| 6,636,880 B1 | 10/2003 | Bera | 708/206 |
| 6,643,650 B1 | 11/2003 | Slaughter et al. | 707/10 |
| 6,654,734 B1 | 11/2003 | Mani et al. | 707/2 |
| 6,654,932 B1 | 11/2003 | Bahrs et al. | 715/507 |
| 6,658,623 B1 | 12/2003 | Schilit et al. | 715/513 |
| 6,687,485 B2 | 2/2004 | Hopkins et al. | 434/350 |
| 6,694,307 B2 | 2/2004 | Julien | 707/3 |
| 6,697,824 B1 | 2/2004 | Bowman-Amuah | 707/229 |
| 6,697,837 B1 | 2/2004 | Rodov | 709/203 |
| 6,708,189 B1 | 3/2004 | Fitzsimons et al. | 707/205 |
| 6,715,144 B2 | 3/2004 | Daynes et al. | 717/174 |
| 6,717,593 B1 | 4/2004 | Jennings | 715/760 |
| 6,718,516 B1 | 4/2004 | Claussen et al. | 715/513 |
| 6,728,679 B1 | 4/2004 | Strubbe et al. | 704/270.1 |
| 6,732,090 B2 | 5/2004 | Shanahan et al. | 707/3 |
| 6,732,361 B1 | 5/2004 | Andreoli et al. | 719/313 |
| 6,741,994 B1 | 5/2004 | Kang et al. | 707/102 |
| 6,742,054 B1 | 5/2004 | Upton, IV | 710/6 |
| 6,745,208 B2 | 6/2004 | Berg et al. | 707/201 |
| 6,766,326 B1 | 7/2004 | Cena | 707/101 |
| 6,795,808 B1 | 9/2004 | Strubbe et al. | 704/275 |
| 6,802,061 B1 | 10/2004 | Parthasarathy et al. | 717/173 |
| 6,826,726 B2 | 11/2004 | Hsing et al. | 715/513 |
| 6,829,631 B1 | 12/2004 | Forman et al. | 709/202 |
| 6,845,499 B2 | 1/2005 | Srivastava et al. | 717/100 |
| 6,857,103 B1 | 2/2005 | Wason | 715/709 |
| 6,859,908 B1 | 2/2005 | Clapper | 715/224 |
| 6,868,625 B2 | 3/2005 | Szabo | 715/738 |
| 6,874,125 B1 | 3/2005 | Carroll et al. | 715/705 |
| 6,874,143 B1 | 3/2005 | Murray et al. | 717/173 |
| 6,883,137 B1 | 4/2005 | Girardot et al. | 715/513 |
| 6,898,604 B1 | 5/2005 | Ballinger et al. | 707/101 |
| 6,901,402 B1 | 5/2005 | Corston-Oliver et al. | 701/101 |
| 6,904,560 B1 | 6/2005 | Panda | 715/202 |
| 6,925,457 B2 | 8/2005 | Britton et al. | 707/1 |
| 6,925,470 B1 | 8/2005 | Sangudi et al. | 707/102 |
| 6,944,857 B1 | 9/2005 | Glaser et al. | 717/173 |
| 6,948,133 B2 | 9/2005 | Haley | 715/780 |
| 6,950,831 B2 | 9/2005 | Haley | 707/104.1 |
| 6,950,982 B1 | 9/2005 | Dourish | 715/512 |
| 6,957,385 B2 | 10/2005 | Chan et al. | 715/504 |
| 6,963,867 B2 | 11/2005 | Ford et al. | 707/3 |
| 6,964,010 B1 | 11/2005 | Sharp | 715/507 |
| 6,975,983 B1 | 12/2005 | Fortescue et al. | 704/9 |
| 6,976,090 B2 | 12/2005 | Ben-Shaul et al. | 709/246 |
| 6,976,209 B1 | 12/2005 | Storisteanu et al. | 715/512 |
| 6,981,212 B1 | 12/2005 | Claussen et al. | 715/205 |
| 6,986,104 B2 | 1/2006 | Green et al. | 715/523 |
| 6,990,654 B2 | 1/2006 | Carroll, Jr. | 717/109 |
| 7,003,522 B1 | 2/2006 | Reynar et al. | 707/10 |
| 7,013,289 B2 | 3/2006 | Horn et al. | 705/26 |
| 7,024,658 B1 | 4/2006 | Cohen et al. | 717/117 |
| 7,028,312 B1 | 4/2006 | Merrick et al. | 719/330 |
| 7,032,174 B2 | 4/2006 | Montero et al. | 715/257 |
| 7,039,859 B1 | 5/2006 | Sundaresan | 715/229 |
| 7,051,076 B2 | 5/2006 | Tsuchiya | 709/206 |
| 7,082,392 B1 | 7/2006 | Butler et al. | 704/233 |
| 7,100,115 B1 | 8/2006 | Yennaco | 715/748 |
| 7,113,976 B2 | 9/2006 | Watanabe | 709/206 |
| 7,146,564 B2 | 12/2006 | Kim et al. | 715/235 |
| 7,216,351 B1 | 5/2007 | Maes | 719/328 |
| 7,237,190 B2 | 6/2007 | Rollins et al. | 715/234 |
| 7,281,245 B2 | 10/2007 | Reynar et al. | 717/173 |
| 7,302,634 B2 | 11/2007 | Lucovsky et al. | 715/200 |
| 7,305,354 B2 | 12/2007 | Rodriguez et al. | 705/26 |
| 7,392,479 B2 | 6/2008 | Jones et al. | 715/513 |
| 7,421,645 B2 | 9/2008 | Reynar | 715/206 |
| 7,454,459 B1 | 11/2008 | Kapoor et al. | 709/203 |
| 2001/0029605 A1 | 10/2001 | Forbes et al. | 717/11 |
| 2001/0041328 A1 | 11/2001 | Fisher | 434/157 |
| 2001/0042098 A1 | 11/2001 | Gupta et al. | 709/206 |
| 2001/0049702 A1 | 12/2001 | Najmi | 707/513 |
| 2001/0056461 A1 | 12/2001 | Kampe et al. | 709/201 |
| 2002/0002590 A1 | 1/2002 | King et al. | 709/206 |
| 2002/0003469 A1 | 1/2002 | Gupta | 340/407.1 |
| 2002/0003898 A1 | 1/2002 | Wu | 382/187 |
| 2002/0004803 A1 | 1/2002 | Serebrennikov | 715/513 |
| 2002/0007309 A1 | 1/2002 | Reynar | 705/14 |
| 2002/0023113 A1 | 2/2002 | Hsing et al. | 707/513 |
| 2002/0023136 A1 | 2/2002 | Silver et al. | 709/206 |
| 2002/0026450 A1 | 2/2002 | Kuramochi | 707/104.1 |
| 2002/0029304 A1 | 3/2002 | Reynar et al. | 709/332 |
| 2002/0035581 A1 | 3/2002 | Reynar et al. | 715/513 |
| 2002/0038180 A1 | 3/2002 | Bellesfield et al. | 701/202 |
| 2002/0065110 A1 | 5/2002 | Enns et al. | 455/566 |
| 2002/0065891 A1 | 5/2002 | Malik | 709/206 |
| 2002/0066073 A1 | 5/2002 | Lienhard et al. | 717/105 |
| 2002/0078222 A1 | 6/2002 | Compas et al. | 709/232 |
| 2002/0091803 A1 | 7/2002 | Imamura et al. | 709/220 |
| 2002/0099687 A1 | 7/2002 | Krishnaprasad et al. | 707/1 |
| 2002/0100036 A1 | 7/2002 | Moshir et al. | 717/173 |
| 2002/0103829 A1 | 8/2002 | Manning et al. | 707/513 |
| 2002/0104080 A1 | 8/2002 | Woodard et al. | 717/176 |
| 2002/0110225 A1 | 8/2002 | Cullis | 379/67.1 |
| 2002/0111928 A1 | 8/2002 | Haddad | 707/1 |
| 2002/0120685 A1 | 8/2002 | Srivastava et al. | 709/203 |
| 2002/0129107 A1 | 9/2002 | Loughran et al. | 709/206 |
| 2002/0133523 A1 | 9/2002 | Ambler et al. | 707/536 |
| 2002/0149601 A1 | 10/2002 | Rajarajan et al. | 345/619 |
| 2002/0156774 A1 | 10/2002 | Beauregard et al. | 707/3 |
| 2002/0156792 A1 | 10/2002 | Gombocz et al. | 707/100 |
| 2002/0169802 A1 | 11/2002 | Brewer et al. | 707/513 |
| 2002/0175955 A1 | 11/2002 | Gourdol et al. | 345/821 |
| 2002/0178008 A1 | 11/2002 | Reynar | 704/272 |
| 2002/0178182 A1 | 11/2002 | Wang et al. | 715/501.1 |
| 2002/0184247 A1 | 12/2002 | Jokela et al. | 707/204 |
| 2002/0188941 A1 | 12/2002 | Cicciarelli et al. | 717/175 |
| 2002/0196281 A1 | 12/2002 | Audleman et al. | 345/762 |
| 2002/0198909 A1 | 12/2002 | Huynh et al. | 707/513 |
| 2003/0002391 A1 | 1/2003 | Biggs | 368/82 |
| 2003/0005411 A1 | 1/2003 | Gerken | 717/120 |
| 2003/0009489 A1 | 1/2003 | Griffin | 707/500 |
| 2003/0014745 A1 | 1/2003 | Mah et al. | 717/170 |
| 2003/0025728 A1 | 2/2003 | Ebbo et al. | 345/744 |

| | | | |
|---|---|---|---|
| 2003/0046316 A1 | 3/2003 | Gergic et al. ............... 707/513 |
| 2003/0050911 A1 | 3/2003 | Lucovsky et al. ............. 707/1 |
| 2003/0051236 A1 | 3/2003 | Pace et al. ................. 717/177 |
| 2003/0056207 A1 | 3/2003 | Fischer et al. .............. 717/174 |
| 2003/0081791 A1 | 5/2003 | Erickson et al. ............. 380/282 |
| 2003/0083910 A1 | 5/2003 | Sayal et al. ..................... 705/7 |
| 2003/0084138 A1 | 5/2003 | Tavis et al. .................. 709/223 |
| 2003/0097318 A1 | 5/2003 | Yu et al. ....................... 705/35 |
| 2003/0101190 A1 | 5/2003 | Horvitz et al. ............... 707/100 |
| 2003/0101204 A1 | 5/2003 | Watson ....................... 708/206 |
| 2003/0101416 A1 | 5/2003 | McInnes et al. ............. 715/513 |
| 2003/0106040 A1 | 6/2003 | Rubin et al. ................. 717/106 |
| 2003/0115039 A1 | 6/2003 | Wang ............................ 704/4 |
| 2003/0121033 A1 | 6/2003 | Peev et al. ................... 717/175 |
| 2003/0126136 A1 | 7/2003 | Omoigui ....................... 707/10 |
| 2003/0140308 A1 | 7/2003 | Murthy et al. ............... 715/500 |
| 2003/0154144 A1 | 8/2003 | Pokorny et al. ............... 705/28 |
| 2003/0158841 A1 | 8/2003 | Britton et al. ................... 707/3 |
| 2003/0158851 A1 | 8/2003 | Britton et al. ............... 707/100 |
| 2003/0167445 A1 | 9/2003 | Su et al. ...................... 715/513 |
| 2003/0172343 A1 | 9/2003 | Leymaster et al. .......... 715/500 |
| 2003/0177341 A1 | 9/2003 | Devillers ..................... 712/227 |
| 2003/0182391 A1 | 9/2003 | Leber et al. ................. 709/217 |
| 2003/0192040 A1 | 10/2003 | Vaughan ...................... 717/173 |
| 2003/0195937 A1 | 10/2003 | Kircher et al. .............. 709/207 |
| 2003/0212527 A1 | 11/2003 | Moore et al. ................ 702/179 |
| 2003/0220795 A1 | 11/2003 | Araysantiparb et al. ..... 704/275 |
| 2003/0229593 A1 | 12/2003 | Raley et al. ................... 705/55 |
| 2003/0233330 A1 | 12/2003 | Raley et al. ................... 705/55 |
| 2004/0002939 A1 | 1/2004 | Arora et al. ..................... 707/1 |
| 2004/0003389 A1 | 1/2004 | Reynar et al. ............... 717/178 |
| 2004/0006564 A1 | 1/2004 | Lucovsky et al. ............. 707/10 |
| 2004/0006741 A1 | 1/2004 | Radja et al. ................. 715/513 |
| 2004/0024875 A1 | 2/2004 | Horvitz et al. ............... 709/226 |
| 2004/0039990 A1 | 2/2004 | Bakar et al. ................. 715/505 |
| 2004/0044959 A1 | 3/2004 | Shanmugasundaram et al. .......................... 715/513 |
| 2004/0068694 A1 | 4/2004 | Kaler et al. ................. 715/513 |
| 2004/0083218 A1 | 4/2004 | Feng ........................... 707/100 |
| 2004/0133846 A1 | 7/2004 | Khoshatefeh et al. ....... 715/500 |
| 2004/0143581 A1 | 7/2004 | Bohannon et al. .......... 707/100 |
| 2004/0165007 A1 | 8/2004 | Shafron ....................... 345/781 |
| 2004/0199861 A1 | 10/2004 | Lucovsky ................... 715/500 |
| 2004/0201867 A1 | 10/2004 | Katano ...................... 358/1.15 |
| 2004/0236717 A1 | 11/2004 | Demartini et al. .............. 707/1 |
| 2005/0050164 A1 | 3/2005 | Burd et al. ................... 709/217 |
| 2005/0055330 A1 | 3/2005 | Britton et al. ................... 707/1 |
| 2005/0094850 A1 | 5/2005 | Nakao ......................... 382/103 |
| 2005/0108195 A1 | 5/2005 | Yalovsky et al. ............... 707/1 |
| 2005/0120313 A1 | 6/2005 | Rudd et al. .................. 715/866 |
| 2005/0187926 A1 | 8/2005 | Britton et al. ................... 707/3 |
| 2006/0173674 A1 | 8/2006 | Nakajima et al. ............. 704/9 |

FOREIGN PATENT DOCUMENTS

| | | |
|---|---|---|
| CN | ZL 2004 1 0005390 | 10/2008 |
| EP | 0 364 180 A2 | 4/1990 |
| EP | 0481784 A2 | 4/1992 |
| EP | 0598511 A2 | 5/1994 |
| EP | 0872827 A2 | 10/1998 |
| EP | 0810520 B1 | 12/1998 |
| EP | 1093058 A1 | 4/2001 |
| EP | 1280068 A2 | 1/2003 |
| EP | 1361523 A2 | 11/2003 |
| EP | 1376392 A2 | 1/2004 |
| EP | 1 447 754 A1 | 8/2004 |
| EP | 1 452 966 A3 | 9/2004 |
| JP | 64-88771 | 4/1989 |
| JP | 05-174013 | 7/1993 |
| JP | 08-272662 | 10/1996 |
| JP | 09-138636 | 5/1997 |
| JP | 10-171827 | 6/1998 |
| JP | 2000-222394 | 8/2000 |
| JP | 2000-231566 | 8/2000 |
| JP | 2001-014303 | 1/2001 |
| JP | 2001-125994 | 5/2001 |
| JP | 2001-522112 | 11/2001 |
| JP | 2001-0350464 | 12/2001 |
| JP | 2002-041353 | 2/2002 |
| JP | 2002163250 A | 6/2002 |
| JP | 2002-222181 | 8/2002 |
| JP | 2003-141174 | 5/2003 |
| WO | WO 95/07510 A1 | 3/1995 |
| WO | WO 99/17240 A1 | 4/1999 |
| WO | WO 00/67117 | 11/2000 |
| WO | WO 00/73949 A1 | 12/2000 |
| WO | WO 01/18687 A1 | 3/2001 |
| WO | WO 01/37170 A2 | 5/2001 |
| WO | WO 01/86390 A2 | 11/2001 |
| WO | WO 02/99627 A1 | 1/2002 |
| WO | WO 02/15518 A2 | 2/2002 |
| WO | WO 02/42928 A1 | 5/2002 |
| WO | WO 2004/012099 A2 | 2/2004 |

OTHER PUBLICATIONS

Design methodology and formal validation of hypermedia documents; C.A.S. Santos, L.F.G Soares, G.L. de Souza and J.P. Courtiat; *Proceedings of the sixth ACM international conference on multimedia*, (1998) p. 39-48.

Constructing, organizing, and visualizing collections of tropically related Web resources; Loren Terveen, Will Hill and Brian Amento; *ACM Trans. Comput.-um. Interact.* 6, 1 (Mar. 1999) p. 67-94.

How to personalize the Web; Rob Barrett, Paul P. Maglio and Daniel C. Kellem; *Conference proceedings on human factors in computing systems* (1997) p. 75-82.

CLUES: dynamic personalized message filtering; Matthew Marx and Chris Schmandt; *Proceedings of the ACM 1996 conference on computer supported cooperative work* (1996) p. 113-121.

Dynamic hyperlink generation for navigation in relational databases; Karl M. Goschka and Jurgen Falb; *Proceedings of the tenth ACM conference on hypertext and hypermedia: returning to our diverse roots* (1999) p. 23-24.

Percepual user interfaces: perceptual intelligence; Alex Pentland; *Commun. ACM* 43, 3 (Mar. 2000) p. 35-44.

Textual context analysis for information retrieval; Mark A. Stairmand; *Proceedings of the 20th annual international ACM SIGIR conference on research and development in information retrieval* (1997) p. 140-147.

An XML framework for agent-based E-commerce; Robert J. Glushko, Jay M. Tenenbaum and Bart Meltzer; Commun. ACM 42, 3 (Mar. 1999) p. 106.

Technique for Automatically Correcting Words in Text; Karen Kukich;*ACM Comput. Surv.*, 24, 4 (Dec. 1992); pp. 377-439.

Putting People First: Specifying Proper Names in Speech Interfaces, Matt Marx and Chris Schmandt; *Proceedings of the ACM Symposium on User Interface Software and Technology*; 1994; pp. 29-37.

Interface and execution models in the fluke kernel; Bryan Ford, Mike Hibler, Jay Lepreau, Roland McGrath and Patrick Tullman; *Proceedings of the third symposium on operating systems design and implementation*, (1999) p. 101-115.

Exploring the applications user-expertise assessment for intelligent interfaces; Michel C. Desmarais and Jiming Liu; *Proceedings of the conference on human factors in computing systems*, (1993) p. 308-313.

Future directions in user-computer interface software; James D. Foley; *Conference proceedings on organizational computer systems*, (1991) p. 289-297.

Human-computer interface development: concepts and systems for its management H. Rex Hartson and Deborah Hix; *ACM Comput. Surv.* 1 (Mar. 1989) p. 5-92.

Integrating computer technology, people technology; strategies and case studies from Georgia Tech's Graphics, Visualization and Usability Center, Jim Foley; *Proceedings of the workshop on advanced visual interfaces*, (1994) p. 34-43.

Command management system for next-generation user input; M. Tsai, P. Reiher and G.J. Popek; *Proceedings of the seventh workshop on hottopics in operating systems*, (1999) p. 17984.
U.S. Appl. No. 09/818,157, filed Mar. 27, 2001, entitled "Automatically Adding Proper Names to a Database."
U.S. Appl. No. 09/841,265, filed Apr. 24, 2001, entitled "Method and System for Applying Input Mode Bias."
U.S. Appl. No. 09/841,266, filed Apr. 24, 2001, entitled "Method and System for Providing Electronic Commerce Actions Based on Semantically Labeled Strings."
U.S. Appl. No. 09/906,467, filed Jul. 16, 2001, entitled "Application Program Interfaces for Semantically Labeling Strings and Providing Actions Based on Semantically Labeled Strings."
U.S. Appl. No. 09/907,418, filed Jul. 17, 2001, entitled "Method and System for Defining Semantic Categories and Actions."
U.S. Appl. No. 09/588,411, filed Jun. 6, 2000, entitled "Method and System for Semantically Labeling Strings and Providing Actions Based on Semantically Labeled Strings."
U.S. Appl. No. 10/141,712, filed May 9, 2002, entitled "Method, System, and Apparatus for Converting Dates Between Calendars and Languages Based Upon Semantically Labeled Strings."
U.S. Appl. No. 10/154,630, filed May 23, 2002, entitled "Method, System, and Apparatus for Converting Numbers Based Upon Semantically Labeled Strings."
U.S. Appl. No. 10/140,544, filed May 7, 2002, entitled "Method, System, and Apparatus for Converting Numbers Between Measurement Systems Based Upon Semantically Labeled Strings."
U.S. Appl. No. 10/155,680, filed May 23, 2002, entitled "Method, System, and Apparatus for Converting Currency Values Based Upon Semantically Labeled Strings."
U.S. Appl. No. 10/179,810, filed Jun. 25, 2002, entitled "Method, System, and Apparatus for Performing Custom Actions on Digital Content."
U.S. Appl. No. 10/178,680, filed Jun. 24, 2002, entitled "System and Method for Incorporating Smart Tags in Online Content."
U.S. Appl. No. 10/179,438, filed Jun. 25, 2002, entitled "Method and System for Dynamically Providing Actions Associated with Semantically Labeled Strings."
U.S. Appl. No. 10/184,298, filed Jun. 27, 2002, entitled "Method and System for Associating Actions with Semantic Labels in Electronic Documents."
U.S. Appl. No. 10/426,446, filed Apr. 29, 2003, Feinberg et al.
Willisson, Pace, et al., "UNIX Man Pages: ispell," http://www.comp.lancs.ac.uk/computing/users/eiamjw/unix/chap8.html, http://www.physics.umn.edu/cgi-bin/man-cgi?spell, http://www.vorlesungen.uni-osnabrueck.de/informatik/shellscript/Html/Man/_Man_NeXT_html/html, http://duplex.hypermart.net/books.bsd/501-504.html, pp. 1-20.
Kuenning, Geoff, "International Ispell," Version 3.1.00, Oct. 8, 1993, http:// www.rt.com/man/findaffix.1.html, http://www.csee.usf.edu/cgi-bin/man-cig?ispell, http://fmg-www.cs.ucla.edu/geoff/ispell.html, pp. 1-33.
Kuenning, Geoff, "Ispell, v. 3.1," http://theochem.ki.ku.dk/on_line_docs/ispell/ispell_1.html, pp. 1-6.
"UNIX Man Pages: sed," http://www.calpoly.edu/cgi-bin/man-cgi?spell+1, pp. 1-14.
McMahon, Lee. E., "SED—A Non-Interactive Text Editor," Bell Laboratories, Murray Hill, New Jersey 07974, pp. 1-15.
Beitner, N.D.; Hall, W.; Goble, C.A., "Multimedia Support and Authoring in Microcosm: An Extended Model," Dept. of Electronics and Computer Science, Univ. of Southampton, Southampton SO17 1BJ, UK; Dept. of Computer Science, Univ. of Manchester, Oxford Road, Manchester MI3 9PL, UK, pp. 1-12.
IBM Corporation, IBM Research Disclosure #368; "Multimedia Hyperlinks Automatically Created For Reference Documents," *IBM Technical Disclosure* Bulletin, Jun. 1993, pp. 1-5.
*The Complete LINUX™ Operating System 5.2 Deluxe*, Red Hat,® Macmillian Digital Publishing USA, A Viacom Company, Red Hat Software, Inc., ISBN 1-57595-199-1B, pp. 1-385.
*User Manual For AddressMate and AddressMate Plus*, CoStar Corporation, AddressMate Software, 1994-1995, pp. 1-210.
*Getting Results With Microsoft® Office 97*, Real World Solutions For The Work You Do, Microsoft Corporation, pp. 1-703.

*InfoCentral™ 7*, User's Manual, Corel Corporation, vol. 1, Version 7.0, 1996, pp. 1-86.
Corel® Office Professional 7 Quick Results User's Manual, vol. 1, Version 7.0 (first printing), Corel Corporation, Limited, pp. 1-531.
Novell GroupWise User's Guide for Windows 16-Bit Version 5.2, Novell, Inc., 1993-1997, pp. 1-231.
Novell GroupWise User's Guide for Windows 32-Bit Version 5.2, Novell, Inc., 1998, pp. 1-318.
Claris Em@iler Getting Started User's Guide, For Macintosh, Claris Corporation, 1995-1997.
Developer's Guide To Apple Data Detectors, For Version 1.0.2., Apple Computer, Inc., 1997, pp. 1-33.
Apple Data Detectors User's Manual, Apple Computer, Inc., 1997, pp. 1-15.
Nardi, Bonnie A.; Miller, James R.; Wright, David J., "Collaborative, Programmable Intelligent Agents," Jim Miller/Miramontes Computing, Apple Computer Advanced Technology Group, Mar. 1998, pp. 1-11.
European Communication dated Feb. 16, 2007 cited in European Application No. 04 003 683.2-2211.
Anonymous, "Adding Data from Other Sources in PowerPoint 2002," Jul. 2002, Internet article, XP-002420700, A Professional Approach Series the E-Zine Approach, http://www.glencoe.com/ps/computered/pas/article.php4?articleId-437, 8 pgs.
Rice, F.C., "Transform XML Files with XSLT When Importing into Microsoft Excel 2002," Jul. 2001, Internet article, XP-002420701, http://msdn2.microsoft.com/en-us/library/aa140055(office,10,d=printer).aspx, 9 pgs.
Johnson, L., "What's So Special About Paste Special?", Jun. 2002, Internet article, XP-002420702, http://pubs.logicalexpressions.com/Pub0009/LPMArticle.asp?ID=40, 5 pgs.
Anonymous, "Moving and Copying Text Tutorial," Aug. 17, 2001, Internet Article, XP-002307566, http://tutorials.findtutorials.com/read/category/102/id/342/p/3, 4 pgs.
U.S. Official Action dated Mar. 9, 2007 cited in U.S. Appl. No. 10/426,446.
U.S. Official Action dated Mar. 12, 2007 cited in U.S. Appl. No. 10/141,712.
U.S. Official Action dated Apr. 10, 2007 cited in U.S. Appl. No. 09/907,418.
European Communication dated Dec. 11, 2006 in EP 03 012 830.0-2211.
Singapore Search Report/Written Opinion dated Jan. 26, 2007 in SG 200500214-2.
U.S. Official Action dated Feb. 6, 2007 cited in U.S. Appl. No. 09/588,411.
U.S. Official Action dated Feb. 7, 2007 cited in U.S. Appl. No. 10/179,438.
U.S. Official Action dated Feb. 21, 2007 cited in U.S. Appl. No. 10/366,141.
European Communication dated Nov. 17, 2006 in EP 03 011 851.7-2211.
U.S. Official Action dated Jan. 11, 2007 in U.S. Appl. No. 10/184,190.
U.S. Official Action dated Jan. 25, 2007 in U.S. Appl. No. 10/608,267.
European Patent Office Communication dated Apr. 19, 2006 in Application No. 05 000 506.5—1527.
U.S. Office Action dated Dec. 20, 2006, U.S. Appl. No. 10/154,630.
U.S. Office Action dated Dec. 26, 2006, U.S. Appl. No. 10/179,810.
U.S. Office Action dated Jan. 5, 2007, U.S. Appl. No. 10/183,317.
European Communication dated Nov. 9, 2006 in EP 03010292.5.
"Word 2002 Add in: measurement Converter Smart Tag", http://www.microsoft.com/downloads/details.aspx?FamilyID=f67fc42c-5f41-4c3f-9d5a-71354471dc32&DisplayLang=en, retrieved on Nov. 9, 2006, 2 pgs.
"Microsoft Measurement Converter Smart Tag—Chinese Version", http://www.jiyang.gov/cn/laiying/My%20Pictures/%E8%B4%E5%BA%86%E8%BE%89/office2003/FILES/PFILES/COMMON/MSSHARED/SMARTTAG/CMEASURE/1033/CHMCABT.HTM, retrieved on Nov. 7, 2006, 2 pgs.
U.S. Office Action dated Nov. 9, 2006 cited in U.S. Appl. No. 10/184,298.

U.S. Office Action dated Nov. 15, 2006 cited in U.S. Appl. No. 10/179,438.
European Communication dated Sep. 25, 2006 in EP 03 01 4181.
World Wide Web Consortium, "Document Object Model (DOM) Level 2 Events Specification, Version 1.0", http://www.w3.org/TR/2000/REC-DOM-Level-2-Events-20001113/DOM2-Events.pdf, Nov. 2000, 50 pp.
World Wide Web Consortium, "Document Object Model (DOM) Level 2 Core Specification, Version 1.0", http://www.w3.org/TR/2000/REC-DOM-Level-2-Core-20001113/DOM2-Core.pdf, Nov. 2000, 107 pp.
U.S. Final Official Action dated Oct. 19, 2006 cited in U.S. Appl. No. 09/906,467.
U.S. Official Action dated Sep. 28, 2006 cited in U.S. Appl. No. 10/608,267.
U.S. Final Official Action dated Oct. 5, 2006 cited in U.S. Appl. No. 09/841,266.
U.S. Official Action dated Oct. 6, 2006 cited in U.S. Appl. No. 10/140,544.
U.S. Official Action dated Oct. 10, 2006 cited in U.S. Appl. No. 09/841,265.
U.S. Official Action dated Sep. 7, 2006 cited in U.S. Appl. No. 10/155,680.
U.S. Final Official Action dated Aug. 18, 2006 cited in U.S. Appl. No. 09/907,418.
U.S. Official Action dated Aug. 9, 2006 cited in U.S. Appl. No. 10/164,960.
U.S. Official Action dated Aug. 2, 2006 in U.S. Appl. No. 10/731,899.
Malaysian Search Report dated Aug. 2, 2007 cited in Malaysian Application No. PI 20040265.
U.S. Office Action dated Sep. 27, 2007 cited in U.S. Appl. No. 10/608,267.
U.S. Final Office Action dated Jul. 26, 2007 cited in U.S. Appl. No. 10/164,960.
U.S. Office Action dated Aug. 10, 2007 cited in U.S. Appl. No. 10/179,810.
U.S. Office Action dated Sep. 10, 2007 cited in U.S. Appl. No. 10/179,438.
U.S. Office Action dated Jun. 28, 2007 cited in U.S. Appl. No. 09/841,266.
U.S. Final Office Action dated Jul. 12, 2007 cited in U.S. Appl. No. 10/184,298.
U.S. Office Action dated Jul. 13, 2007 cited in U.S. Appl. No. 10/134,630.
U.S. Office Action dated Jul. 20, 2007 cited in U.S. Appl. No. 09/841,265.
U.S. Final Official Action dated May 18, 2007 cited in U.S. Appl. No. 10/155,680.
U.S. Official Action dated May 30, 2007 cited in U.S. Appl. No. 09/906,467.
U.S. Final Official Action dated Jun. 15, 2007 cited in U.S. Appl. No. 10/731,899.
Blaheta et al., "Assigning Function Tags to Parsed Text," Morgan Kaufmann Publishers Inc., 2000, pp. 234-240.
Russian Official Action dated Oct. 11, 2008 cited in Russian Application No. 2003118722.
Pershikov, V.I., "Explanatory Dictionary in Informatics," Finances and Statistics, Moscow, 1991 (in Russian with translated sections) 5 pgs.
U.S. Final Office Action dated Dec. 18, 2007 cited in U.S. Appl. No. 10/366,141.
European Communication dated Sep. 25, 2007 cited in European Application No. 03 014 181.6—1243.
Japanese Official Action dated Oct. 19, 2007 cited in Japanese Application No. 2003-128417.
Rubin, Charles, "Microsoft Word 2000 Official Manual," First Edition, Nikkei BP Soft Press, Inc., Aug. 2, 1999, pp. 215-217.
U.S. Final Office Action dated Dec. 7, 2007 cited in U.S. Appl. No. 10/426,446.
U.S. Appl. No. 11/924,856, filed Oct. 26, 2007 entitled "Providing Contextually Sensitive Tools and Help Content in Computer-Generated Documents".

U.S. Office Action dated Oct. 9, 2007 cited in U.S. Appl. No. 10/183,317.
U.S. Final Office Action dated Oct. 16, 2007 cited in U.S. Appl. No. 09/907,418.
U.S. Office Action dated Oct. 17, 2007 cited in U.S. Appl. No. 10/155,680.
U.S. Final Office Action dated Oct. 19, 2007 cited in U.S. Appl. No. 10/184,190.
U.S. Final Office Action dated Oct. 19, 2007 cited in U.S. Appl. No. 09/588,411.
U.S. Final Office Action dated Oct. 19, 2007 cited in U.S. Appl. No. 10/141,712.
U.S. Final Office Action dated Dec. 26, 2007 cited in U.S. Appl. No. 09/841,265.
U.S. Office Action dated Dec. 26, 2007 cited in U.S. Appl. No. 10/377,258.
U.S. Final Office Action dated Jan. 7, 2008 cited in U.S. Appl. No. 10/179,438.
U.S. Final Office Action dated Jan. 9, 2008 cited in U.S. Appl. No. 09/906,467.
David D. Lewis et al., "A Sequential Algorithm for Training Text Classifiers," Spring-Verlag New York, Inc., 1994, pp. 1-10.
U.S. Office Action dated Jan. 25, 2008 cited in U.S. Appl. No. 10/608,267.
U.S. Office Action dated Feb. 8, 2008 cited in U.S. Appl. No. 10/141,712.
U.S. Office Action dated Feb. 15, 2008 cited in U.S. Appl. No. 10/731,899.
U.S. Final Office Action dated Feb. 20, 2008 cited in U.S. Appl. No. 10/154,630.
Singapore Examination Reported (conducted by Austrian Patent Office) dated Jan. 25, 2008 cited in SG Application No. 200500214-2.
Chinese Official Action dated Dec. 28, 2007 cited in Application No. 200410005390.8.
Chinese Official Action dated Jan. 4, 2008 cited in Application No. 200510009487.0.
Wei Ying-bin et al., "A New Technology ColdFusion of Realizing Dynamic Webpage," 2000, 6 pgs. (English language translation, pp. 1-6).
European Examination Report dated Mar. 4, 2006 cited in EP Application No. 02 014 717.9-1527.
European Examination Report dated Mar. 4, 2006 cited in EP Application No. 03 012 432.5-1527.
Russian Official Action dated Jan. 11, 2008 cited in Russian Application No. 2004105880/09(006292).
V. Doroth et al., "Modern Computer Vocabulary," St. Petersburg, BHV-Peterburg, 2001, p. 465 (with English language translation).
U.S. Official Action mailed Apr. 1, 2008 cited in U.S. Appl. No. 09/907,418.
U.S. Official Action mailed Apr. 4, 2008 cited in U.S. Appl. No. 10/155,680.
U.S. Official Action mailed Apr. 29, 2008 cited in U.S. Appl. No. 09/588,411.
U.S. Final Official Action mailed Apr. 29, 2008 cited in U.S. Appl. No. 10/179,810.
U.S. Official Action mailed May 1, 2008 cited in U.S. Appl. No. 10/183,317.
European Communication Summons to Attend Oral Proceedings dated Mar. 4, 2008 in EP 05 000 506.5-1527.
European Communication Summons to Attend Oral Proceedings dated Mar. 10, 2008 in EP 03 01 0292.5-1527.
Rubin, C., "Microsoft Word 2000 Official Manual", First Edition, Nikkei BP Soft Press, Inc., Aug. 2, 1999, pp. 215-217.
U.S. Examiner's Answer BPAI dated Jun. 5, 2008 cited in U.S. Appl. No. 10/184,298.
U.S. Office Action dated Jun. 11, 2008 cited in U.S. Appl. No. 09/841,265.
U.S. Office Action dated Jun. 12, 2008 cited in U.S. Appl. No. 10/426,446.
U.S. Office Action dated Jun. 13, 2008 cited in U.S. Appl. No. 10/780,376.

U.S. Final Office Action dated Jun. 27, 2008 cited in U.S. Appl. No. 10/377,258.
M. Stowe, "XML in Excel and the Spreadsheet Component", Microsoft Corporation, Aug. 2001, 6 pgs.
C. Heinemann, "Cross-Reference your XML Data", Microsoft Corporation, Dec. 7, 1998, 6 pgs.
D. Obasanjo, "XML_Namespaces and How They Affect Xpath and XSLT", Microsoft Corporation, May 20, 2002, 19 pgs.
European Communication Summons to Attend Oral Proceedings dated May 7, 2008 cited in European Application No. 04002224.6.
Russian Official Action dated Mar. 13, 2008 cited in Russian Application No. 2004104096/09(004398).
Japanese Official Action dated Mar. 28, 2008 cited in Japanese Application No. 2003-178497.
Pixley, "Document Object Model (DOM) Level 2 Events Specification Version 1.0", World Wide Web Consortium, Nov. 13, 2000, www.w3.org/TR/2000/REC-DOM-Level-2-Events-20001113/DOM2-Events.pdf.
European Communication dated Jun. 3, 2008 cited in European Application No. 03 011 851.7-2211.
Japanese Official Action dated Apr. 18, 2008 cited in Japanese Application No. 2003-128417.
Polish Official Letter dated Jun. 24, 2008 cited Polish Application No. P 365553.
U.S. Final Office Action dated Jul. 29, 2008 cited in U.S. Appl. No. 10/141,712.
"XML Schema Part 2: Datatypes," W3C, May 2, 2001, http://www.w3.org/TR/2001/REC-xmlschema-2-20010502/, pp. 1-146 (separated into 2 documents—A & B).
U.S. Office Action dated Aug. 1, 2008 cited in U.S. Appl. No. 10/366,141.
Ghamrawi et al., "Collective Multi-Label Classification," ACM, 2005, pp. 195-200.
Polish Official Action dated Jul. 21, 2008 cited in Polish Application No. P 364854.
Japanese Office Action dated Jul. 18, 2008 cited in Japanese Application No. 2002-207514.
European Communication Minutes of Oral Proceedings and Decision dated Sep. 15, 2008 in European Application No. 05 000 506.5-1527.
Polish Second Official Action dated Oct. 28, 2008 in Polish Application No. P36553.
"The Spatial Smart Tag", Geomatic Technologies, Mar. 10, 2005, 2 pp.
Harmon, D., "Microsoft MapPoint 2002", Geoworld Quick-Take Reviews, Aug. 2001, 3 pp.
Irie R. et al., "Resources for Place Name Analysis", May 28, 2004, 4 pp.
Rajabifard, A. et al., "Creating an Enabling Platform for the Delivery of Spatial Information", Spatial Sciences Institute Biennial Conference, Sep. 12, 2005, 10 pp.
Camarda, B., Special Editing Using® Microsoft® Office Word 2003, Que, Dec. 12, 2003, pp. 1-5.
Ivens, K., Office XP Smart Tags, Microsoft, Mar. 6, 2002, pp. 1-4.
Frye, C., Microsoft Office Systems: Step by Step, Microsoft Press, 2003 Edition, Sep. 3, 2003, pp. 1-6.
U.S. Official Action mailed Sep. 8, 2006 in U.S. Appl. No. 10/948,948.
U.S. Official Action mailed Feb. 15, 2007 in U.S. Appl. No. 10/948,948.
U.S. Official Action mailed Oct. 18, 2007 in U.S. Appl. No. 10/948,948.
U.S. Official Action mailed Mar. 20, 2008 in U.S. Appl. No. 10/948,948.
U.S. Official Action mailed Oct. 16, 2008 in U.S. Appl. No. 10/948,948.
U.S. Official Action mailed Oct. 16, 2008 in U.S. Appl. No. 10/154,630.
European Search Report dated Dec. 12, 2006 in European Application No. 05 105 000.3-1527.
European Examination Report dated Oct. 9, 2007 in European Application No. 05 105 000.3-1527.
European Preliminary Opinion dated Aug. 27, 2008 cited in European Application No. 04002224.6—1527 / 1447754.
Chinese Official Action dated Dec. 7, 2007 in Chinese Application No. 200510088529.4.
Chinese Second Official Action dated Aug. 15, 2008 in Chinese Application No. 200510088529.4.
Chilean Second Office Action cited in Chilean Application No. 67-2005.
Malaysian Official Action dated Aug. 29, 2008 cited in Malaysian Application No. PI 20031902.
Polish Official Action dated Aug. 27, 2008 in Polish Application No. P360520.
U.S. Official Action dated May 26, 2006 in U.S. Appl. No. 09/588,411.
U.S. Official Action dated May 31, 2006 in U.S. Appl. No. 10/141,712.
U.S. Official Action dated Jun. 1, 2006 in U.S. Appl. No. 10/366,141.
U.S. Appl. No. 11/396,937, filed Apr. 3, 2006, entitled "Automatically Adding Proper Names to a Database".
U.S. Official Action dated Apr. 5, 2006 in U.S. Appl. No. 10/377,258.
U.S. Official Action dated Apr. 10, 2006 in U.S. Appl. No. 10/179,810.
U.S. Official Action dated Apr. 17, 2006 in U.S. Appl. No. 10/179,438.
U.S. Final Official Action dated Apr. 17, 2006 in U.S. Appl. No. 10/184,190.
Hewkin, "Smart Tags—the Distributed-Memory Resolution", IEE Review, Jun. 22, 1989, pp. 203-206.
Measuring Units Conversion Table—http://web.archie.org—1997 Internet French Property, pp. 1-4.
IBM Technical Disclosure Bulletin, "National Language Support Enhancement for Culture-Specific Operations", Nov. 1, 1993, vol. 36, Issue 11, pp. 629-638.
Towers, J. Tarin, Visual Quickstart Guide: Dreamweaver 2 for Windows and Macintosh, 1999, Peachpit Press, pp. 150-151.
Driza, Scott, "Learn Word 2000 VBA Document Automation", Wordware Publishing Inc., 2001, 6 pp.
Cornell, Paul, "Developing Smart Tag DLLs", MSDN Library, http://msdn.microsoft.com/library/default.asp?url=/library/en-us/dnsmarttag/html/odc_smarttags.asp, Apr. 2001, pp. 8.
Menu Customizing, IBM Technical Disclosure Bulletin, vol. 34, No. 1, Jun. 1991, pp. 91-92 (4 pp. total).
Perry, Brad, et al., "Discovering Similar Resources by Content Park-Linking", Proceedings of the Sixth International Conference on Information and Knowledge Management, published by ACM Press 1997, pp. 317-324.
Schulz, Charles, "Writing Applications for Uniform Operation on a Mainframe or PC: A Metric Conversion Program", Lockheed Missles & Space Company, Inc., Sunnyvale, CA, May 1990, pp. 348-361.
Devanbue, P. et al., "Chime: customizable hyperlink insertion and maintenance engine for software engineering environments", Software Engineering, Publication date: 1999, ISBN: 1-58113-07400.
"Using Flyswat", http://www.flywsat.com/using.html, download date: Sep. 28, 1999, 1 pp.
"What is Flyswat", http://www.flyswat.com, download date: Sep. 28, 1999, 5 pp.
"Intelligent Text Processing: About", http://www.syntalex.co.uk/about/about.html, download date: Aug. 7, 1999, 1 pp.
"Intelligent Text Processing: Automatic Cross-Referencing", http://www.syntalex.co.uk/services/acrl.html, download date Aug. 7, 1999, 3 pp.
"Intelligent Text Processing: Case Study: Context", http://www.syntalex.co.uk/casestudies/context.html, download date: Aug. 7, 1999, 3 pp.
"Integrating with External Systems: iPlanet™ Unified Development Server", Sun Microsystems, Inc., Ver. 5.0, Aug. 2001, pp. 127-156.
Sperberg-McQueen, C.M. and Thompson, Henry, "XML Schema", W3C Architecture Domain, http://web.archive.org/web/20020802155904/http://www.w3.org/XML/Schema, 2000-2002, pp. 1-10.
Quin, Liam, "Extensible Markup Language (XML)", W3C Architecture Domain, http://web.archive.org/web/2002121962057/http://www.w3.org/XML/, 1996-2002, pp. 1-3.

Clark, James, and DeRose, Steve, "XML Path Language (XPath), Version 1.0", W3C, http://web.archive.org/web/2021010034434/http://www.w3.org/TR/xpath, 1999-2000, pp. 1-31.

"Microsoft BizTalk Server 2002—Using BizTalk Mapper", http://msdn.Microsoft.com/library/en-us/bts_2002/htm/lat_xmltools_map_intro_zkqb.asp..., Microsoft Corporation, 1999-2001, pp. 1-2.

"BizTalk Server 2002 Mapper User Interface", http://msdn.microsoft.com/library/en-us/bts_2002/htm/lat_xmltools_map_concept_codw..., Microsoft Corporation, 1999-2001, pp. 1.

"BizTalk Server 2002 Compiling Maps", http://msdn.microsoft.com/library/en-us/bts_2002/htm/lat_xmltools_map_concept_drgl.a..., Microsoft Corporation, 1999-2001, pp. 1.

"BizTalk Server 2002 Testing Maps", http://msdn.microsoft.com/library/en-us/bts_2002/htm/lat_xmltools_map_concept_fhhy.a..., Microsoft Corporation, 1999-2001, pp. 1-2.

"BizTalk Server 2002 View Links and Functoids By Using Grid Preview", http://msdn.microsoft.com/library/en-us/bts_2002/htm/lat_xmltools_map_check_fuwn.as..., Microsoft Corporation, 1999-2001, pp. 1.

"The StarOffice™ 6.0 Suite: New Features Guide", Sun Microsystems, V. 1.1, Jul. 2002, pp. 1-31.

"New Microsoft Office Family Application Taps Power of Industry-Standard XML", http://www.microsoft.com/presspass/press/2002/oct02/10-09officefamilypr.mspx, Microsoft Corporation, Oct. 2002-Feb. 2003, pp. 1-2.

"Q&A: How 'XDocs' Alters the Paradigm for Gathering Business-Critical Information", http://www.microsoft.com/presspass/press/2002/oct02/10-09officefamily.mspx, Microsoft Corporation, Oct. 2002-Feb. 2003, pp. 1-4.

"InfoPath: Microsoft Names New Product from Office Group", http://www.microsoft.com/presspass/press/2003/feb03/02-10infopath.mspx, Microsoft Corporation, Oct. 2002-Feb. 2003, pp. 1-4.

"Microsoft Unveils Visual Studio.NET Enterprise Tools", Microsoft Corporation, http://microsoft.com/presspass/press/2001/may01/05-21vseepr.mspx, May 2001, pp. 1-4.

"Microsoft Extends XML Web Services Support in .NET Enterprise Servers Through Visual Studio .NET", http://www.microsoft.com/presspass/press/2002/feb02/02-13servervspr.mspx, Microsoft Corporation, Feb. 2002, pp. 1-3.

"How to Use XSL to Transform Excel XML Spreadsheet for Server-Side Use", http://support.microsoft.com/default.aspx?scid=kb;en-us;278976, Microsoft Corporation, Aug. 2004, pp. 1-7.

Mueller, Jennifer M., "Work Smarter with Smart Tags", Journal of Accounting—Online, vol. 194, No. 5, Nov. 2002, http://www.aicpa.org/pubs/jofa/nov2002/Mueller.htm>, retrieved on Apr. 22, 2005.

M. Fernandez et al., "SilkRoute: trading between relations and XML", Computer Networks, vol. 33, No. 1-6, Jun. 2000, pp. 723-745.

V. Braganholo, "Updating Relational Databases Through XML Views", Technical Report, Sep. 2002, pp. 1-61.

G. Falquet et al., "Design and Analysis of Active Hypertext Views on Databases", Information Sciences Institute, Jan. 2002, pp. 1-24.

S. Ceri et al., "Deriving Production Rules for Incremental View Maintenance", Proceedings of the 17th International Conference on Very Large Data Bases, Sep. 1991, pp. 577-589.

A. Bonifati, "Active Behaviors within XML Document Management", EDBT Ph. D. Workshop, Mar. 2000, pp. 1-4.

"Integrated Development Enviorment (IDE)", http://web.archive.org/web/20020602032242/http:altova.com/products_ide.html, Jun. 2002, pp. 1-2.

"Altova markup your mind!" http://web.archive.org/web/20021204211721/http://altova.com/products_ide.html, Dec. 2002, pp. 1-3.

Arbortext, "Arbortext and Accessibilty", http://web.archive.org/web/20021219133536/www.arbortext.com/html/accessibility.html, Dec. 2002, pp. 1-5.

Arbortext, "XML Compliance, 100% Pure XML", http:web.archive.org/web/20021209185855/www.arbortext.com/html/xml_compliance, Dec. 2002, pp. 1-3.

Arbortext, "Schemas", http://web.archive.org/web/20021221023148/www.arbortext.com/html/schemas.html, Dec. 2002, pp. 1-3.

Arbortext, "Arbortext's Support for XSL-FO", http://web.archive.org/web/20021221021632/www.arbortext.com/html/xsl-fo.html. Dec. 2002, pp. 1-4.

Corel, "Corel XMetal4, Making XML Content Creation Easy", http://web.archive.org/web/20031118215158/www.corel.com/servlet/Satellite?pagename, Nov. 2003, pp. 1-2.

Corel, "Corel XMetal 4 and Interwoven TeamXML", http://web.archive.org/web/20030807211225/www.corel.com/futuretense_cs/ccurl/corel+xml+4+and+interwoven+teamxml.pdf, Aug. 2003, pp. 1-2.

Corel, "The Corel-XyEnterprise XML Solution", http://web.archive.org/web/20030807154355/www.corel.com/futuretense_cs/ccurl/corel+and+XY+enterprise+XML+solution.pdf, Aug. 2003, pp. 1-2.

Brooks-Bilson, "Programming ColdFusion" [electronic resource] 2001, Safari Tech Books Online, 1st Edition, 25 pp.

Wilker, John, "ColdFusion MX Adds J2EE, XML, and Web Services Compatibility", Aug. 9, 2002, http://builder.com.com/5102-6387-104585.html, 3 pp.

Homer, Alex et al., Professional Active Services Pages, 1997, Wrox Press Ltd., Section"Client-Side Scripting and Components", subsection "Choosing Your Applets, and Controls", 16 pp.

Flanagan, D., "JavaScript—The Definitive Guide, Fourth Edition", Jan. 2002, O'Reilly, 12 pp.

Brockschmidt, K., "Inside OLE, Second Edition", 1995, Microsoft Press, p. 169.

Toth, V., "Visual C++ 4 Unleashed", 1996, Sams Publishing, p. 174.

Sriram, V., "ComponentXchange: An E-Exchange for Software Components", Master Thesis, CitSeer, May 2001, pp. i-v, 1-77.

Bosak, "XML: The Universal Publishing Format", SGML/XML Europe '98, May 1998, pp. A1-C17.

Kristensen, "Template Resolution in XML/HTML", Computer Networks and ISDN Systems, vol. 30, 1998, pp. 239-249.

Fan et al., "FormPlus: A Form Authoring Toolkit", Proceedings of the Fourteenth Annual Computer Software and Applications Conference, Oct. 31, 1990-Nov. 2, 1990, pp. 255-260.

Boone, "Concept Features in Re: Agent, An Intelligent Email Agent", Proceedings of the 2nd International Conference on Autonomous Agents, May 9-13, 1998, pp. 141-148.

Takkinen et al., "CAFÉ: A Conceptual Model for Managing Information in Electronic Mail", Proceedings of the Annual Hawaii International Conference on System Sciences, 1998, pp. 44-53.

"Smart Tags: Dumb Technology?", webreference.com, Online, Aug. 29, 2001, http://www.webreference.com/xml/column30/3.html, 3 pp.

"Being 'Smart' with Smart Tags in Office XP", Create for Mississippi, Aug. 2001, http://www.create.cett.msstate.edu/create/howto/smart_tags.pdf, 7 pp.

Harold, E.R., "XML: Extensible Markup Language", IDG Books Worldwide, Books 24x7.com printout, 1998, pp. 1-11.

Marais, Hannes, "Supporting Cooperative and Personal Surfing With a Desktop Assistant", 1997, ACM Press, pp. 129-138.

U.S. Appl. No. 10/164,960, filed Jun. 6, 2002, entitled "Providing Contextually Sensitive Actions and Help Content in Computer-Generated Documents".

U.S. Appl. No. 10/164,260, filed Jun. 5, 2002, entitled "Mechanism for Downloading Software Components from a Remote Source for Use by a Local Software Application".

U.S. Appl. No. 10/731,899, filed Dec. 9, 2003, entitled "Mechanism for Downloading Components Associated with XML Documents and Smart Documents".

U.S. Appl. No. 10/366,141, filed Feb. 13, 2003, entitled "Linking Elements of a Document to Corresponding Fields, Queries and/or Procedures in a Database".

U.S. Appl. No. 10/377,258, filed Feb. 28, 2003, entitled "Method and System for Enhancing Paste Functionality of a Computer Software Application".

U.S. Appl. No. 10/608,267, filed Jun. 27, 2003, entitled "Leveraging Markup Language Data for Semantically Labeling Text Strings and Data and for Providing Actions Based on Semantically Labeled Text Strings and Data".

U.S. Appl. No. 10/780,376, filed Feb. 17, 2004, entitled "Methods and Systems for Providing Automatic Actions on Recognized Text Strings in a Computer-Generated Document".
U.S. Appl. No. 10/184,190, filed Jun. 27, 2002, entitled "System and Method for Providing Namespace Related Information".
U.S. Appl. No. 10/183,317, filed Jun. 25, 2002, entitled "System and Method for Issuing a Message to a Program".
U.S. Official Action dated Dec. 29, 2003 in U.S. Appl. No. 09/588,411.
U.S. Official Action dated Feb. 12, 2004 in U.S. Appl. No. 10/154,630.
U.S. Official Action dated Jun. 14, 2004 in U.S. Appl. No. 09/588,411.
U.S. Official Action dated Jun. 18, 2004 in U.S. Appl. No. 09/818,157.
U.S. Official Action dated Jul. 15, 2004 in U.S. Appl. No. 09/906,467.
U.S. Official Action dated Aug. 20, 2004 in U.S. Appl. No. 09/841,266.
U.S. Official Action dated Sep. 29, 2004 in U.S. Appl. No. 09/907,418.
U.S. Official Action dated Oct. 6, 2004 in U.S. Appl. No. 09/818,157.
U.S. Official Action dated Nov. 2, 2004 in U.S. Appl. No. 10/178,680.
U.S. Official Action dated Dec. 8, 2004 in U.S. Appl. No. 09/588,411.
U.S. Official Action dated Jan. 26, 2005 in U.S. Appl. No. 10/154,630.
U.S. Official Action dated Mar. 1, 2005 in U.S. Appl. No. 09/818,157.
U.S. Official Action dated Mar. 17, 2005 in U.S. Appl. No. 09/841,265.
U.S. Official Action dated Mar. 24, 2005 in U.S. Appl. No. 10/141,712.
U.S. Official Action dated Apr. 8, 2005 in U.S. Appl. No. 10/164,960.
U.S. Official Action dated Apr. 19, 2005 in U.S. Appl. No. 09/841,266.
U.S. Official Action dated May 5, 2005 in U.S. Appl. No. 09/906,467.
U.S. Official Action dated May 6, 2005 in U.S. Appl. No. 09/907,418.
U.S. Official Action dated May 20, 2005 in U.S. Appl. No. 10/184,298.
U.S. Official Action dated Jun. 3, 2005 in U.S. Appl. No. 10/154,630.
U.S. Official Action dated Jun. 6, 2005 in U.S. Appl. No. 10/164,260.
U.S. Official Action dated Jun. 24, 2005 in U.S. Appl. No. 10/140,544.
U.S. Official Action dated Jul. 25, 2005 in U.S. Appl. No. 10/179,438.
U.S. Official Action dated Sep. 2, 2005 in U.S. Appl. No. 10/366,141.
U.S. Official Action dated Oct. 4, 2005 in U.S. Appl. No. 10/183,317.
U.S. Official Action dated Oct. 5, 2005 in U.S. Appl. No. 10/179,810.
U.S. Official Action dated Nov. 2, 2005 in U.S. Appl. No. 10/184,190.
U.S. Official Action dated Nov. 10, 2005 in U.S. Appl. No. 10/164,260.
U.S. Official Action dated Nov. 15, 2005 in U.S. Appl. No. 09/841,265.
U.S. Official Action dated Nov. 22, 2005 in U.S. Appl. No. 10/141,712.
U.S. Official Action dated Dec. 5, 2005 in U.S. Appl. No. 09/907,418.
U.S. Official Action dated Dec. 14, 2005 in U.S. Appl. No. 10/608,267.
U.S. Official Action dated Dec. 15, 2005 in U.S. Appl. No. 10/155,680.
U.S. Official Action dated Jan. 11, 2006 in U.S. Appl. No. 09/841,266.
U.S. Official Action dated Jan. 17, 2006 in U.S. Appl. No. 10/140,544.
U.S. Official Action dated Feb. 2, 2006 in U.S. Appl. No. 09/906,467.
U.S. Official Action dated Feb. 16, 2006 in U.S. Appl. No. 10/184,298.
U.S. Official Action dated Feb. 24, 2006 in U.S. Appl. No. 10/154,630.
Japanese Office Action dated Oct. 10, 2008 cited in Application No. 2004-037158.
Koyaku, H., "What is Brought to SQL Server 2000 by XML, Part 1: Function of XML Provided by SQL Server 2000", Enterprise Servers World, vol. 3, No. 12, IDG Japan, Inc., Dec. 1, 2000, pp. 42-53.
Chinese Office Action dated Oct. 17, 2008 cited in Application No. 03145242.6.
U.S. Final Office Action dated Dec. 8, 2008 cited in Appl. No. 10/183,317.
Australian First Official Action dated Oct. 21, 2008 cited in Application No. 2003204800.
U.S. Final Office Action dated Dec. 24, 2008 cited in Appl. No. 09/841,265.
Sharon Oviatt et al., "Integration and Synchronization of Input Modes during Multimodal Human-Computer Interaction," CHI 97, Atlanta, Georgia, Mar. 22-27, 1997, pp. 415-422.
U.S. Office Action dated Dec. 23, 2008 cited in Appl. No. 10/179,810.
U.S. Office Action dated Jan. 5, 2009 cited in Appl. No. 10/141,712.
European Statement regarding Grounds of Appeal dated Jan. 13, 2009 cited in Application No. 04 002 224.6.
Mexican Official Action dated Feb. 11, 2009 cited in Application No. PA/a/2003/005451.
Chinese Final Rejection dated Mar. 13, 2009 cited in Application No. 03145242.6.
Japanese Final Rejection dated Mar. 17, 2090 cited in Application No. 2004-037158.
Japanese Final Rejection dated Apr. 3, 2009 cited in Application No. 2002-207514.
C. Goldfarb, XML Handbook, $1^{st}$ Ed., Pearson Education, Japan, May 10, 1999, pp. 246-254 (no English translation).
S. Tanaka, "Verifying the XML Schema Definition," XML Magazine, Shoeisha Co., Ltd., vol. 10, No. 3, Jul. 1, 2000, pp. 135-155 (no English translation).
U.S. Office Action dated Apr. 20, 2009 cited in Appl. No. 10/426,446.
U.S. Office Action dated Apr. 27, 2009 cited in Appl. No. 10/154,630.
Japanese Official Action dated May 26, 2009 cited in Appl. No. 2005-039754.
Chinese Decision on Rejection dated Jul. 3, 2009 cited in Application No. 03143003.1.
European Summons to Attend Oral Proceedings dated Aug. 5, 2009 cited in Application No. 03003931.7.
Polish Official Action dated Aug. 25, 2009 cited in Application No. P. 365553.
Australian Second Official Action dated Sep. 11, 2009 cited in Application No. 2003204478.
Norwegian Official Action dated Aug. 24, 2009 cited in Application No. 2003 2550.
Polish Official Notice dated Sep. 22, 2009 cited in Application No. P. 364854/DP.
Polish Official Notice dated Sep. 23, 2009 cited in Application No. P. 360520/DP.
Korean Official Action dated Sep. 30, 2009 cited in Application No. 10-2003-40988.
Japanese Official Notice of Final Rejection dated Oct. 2, 2009 cited in Application No. 2003-162911.
U.S. Office Action dated Oct. 22, 2009 cited in Appl. No. 10/377,258.
Japanese Official Notice of Final Rejection dated Oct. 27, 2009 cited in Application No. 2003-161338.
Malaysian Examination Report dated Nov. 30, 2009 cited in Application No. PI 20040559.
Australian Third Official Action dated Dec. 23, 2009 cited in Application No. 2003204478.
Russian Official Action dated Jun. 21, 2009 cited in Application No. 2005104223/09(005505).
D. Richter, "Windows for professionals" (Win32 API programming for Windows NT 3.5 and Windows 95, translation from English, Moscow: Russian Edition, 1995, ISBN 5-7502-0010-8, pp. 26, 31, 215.
U.S. Final Office Action dated Nov. 30, 2009 cited in Appl. No. 10/179,810.
Glover et al., "Inferring hierarchical Descriptions," ACM, 2002, pp. 507-514.
Australian First Official Action Report dated Jan. 18, 2009 cited in Application No. 2004200459.
Hara, T. et al.,Inside Microsoft.NET-Complete Explanation, "What Microsoft Aims for", msdn magazine, No. 6, pp. 20-35, ASCII, Japan, Sep. 18, 2000, 19 pages.
Shiroiwa, K., "iMac&iBook, Must-see for User, Full of Recommended Setting Methods and Specially Selected Tips, Mastering Mac 0S9", MacPeople, ASCII Corporation, Japan, Dec. 3, 1999, vol. 5, No. 24, p. 50 (in Japanese - no translation yet).

"Adding Data from Other Source in Power Point 2002,"Internet Article, The McGraw-Hill Companies, Inc., Dec. 21, 2002, *http://web.archive.org/web/20021221085214/http//:www glencoe.com/ps/computered/pas/artucles.php4articleID=432.*

U.S. Final Office Action dated Jan. 22, 2009 cited in Appl. No. 10/366,141.

U.S. Office Action dated Feb. 4, 2009 cited in Appl. No. 10/377,258.

U.S. Final Office Action dated Mar. 4, 2009 cited in Appl. No. 10/780,376.

European Summons to Attend Oral Proceedings dated Feb. 26, 2009 cited in European Appl. No. 0301283.0/2211 (60001.0182EP01).

European Communication dated Mar. 18, 2009 cited in European Appl. No. 04003683.Feb. 2211 (60001.0216EPOI).

European Summons to Attend Oral Proceedings dated Mar. 20, 2009 cited in European Appl. No. 03012830.0 (60001.0182EP01).

Australian First Examiner's Report dated Sep. 15, 2008 cited in Australian Appl. No. 2003204379 (60001.0181AU01).

Japanese Final Official Action dated Nov. 25, 2008 cited in Japanese Appl. No. 2002-207514 (60001.0079JP11).

Japanese Official Action dated Feb. 6, 2009 cited in Japanese Appl. No. 2003-180218 (60001.0190JP01).

Japanese Official Action dated Feb. 13, 2009 cited in Japanese Appl. No. 2003-162911 (60001.018 1JP01).

Japanese Official Action dated Feb. 24, 2009 cited in Japanese Appl. No. 2003-161338 (60001.0182JP01).

Japanese Official Action dated Mar. 6, 2009 cited in Japanese Appl. No. 2004-042140 (60001.0216JP01).

(Previously cited) Koyaku, Il, "What is Brought to SQL Server 2000 by XML, Part I: Function of XML Provided by SQL Server 2000", Enterprise Servers World, vol. 3, No. 12, IDG Japan, Inc., Dec. 1, 2000, pp. 42-53 (with English language translation).

* cited by examiner

METHOD AND SYSTEM FOR PROVIDING RESTRICTED ACTIONS FOR RECOGNIZED SEMANTIC CATEGORIES

REFERENCE TO RELATED APPLICATIONS

This is a continuation-in-part of U.S. patent application Ser. No. 09/588,411, entitled "METHOD AND SYSTEM FOR SEMANTICALLY LABELING STRINGS AND PROVIDING ACTIONS BASED ON SEMANTICALLY LABELED STRINGS", filed Jun. 6, 2000, which is incorporated by reference herein.

TECHNICAL FIELD

This invention relates to a method and system for recognizing semantic categories and providing actions based on those semantic categories. More particularly, this invention relates to restricting the actions for semantic categories to those provided by authorized action providers.

BACKGROUND OF THE INVENTION

Electronic documents typically include semantic information that would be helpful if the information was recognized as such. Recognition and use of this semantic information could result in increased interoperability between desktop software applications and other desktop applications and/or web-based applications. Recognition of this semantic information may also provide benefits in electronic commerce. Independent third parties need to be able to easily develop list of terms for recognition and actions to be provided for this semantic information. However, developers also need to be able to restrict the actions to only authorized actions.

SUMMARY OF THE INVENTION

The present invention is associated with a method for semantically labeling strings in an electronic document and providing actions in association with those recognized strings. A string is defined as a data structure composed of a sequence of characters usually representing human-readable text. Strings are recognized and annotated, or labeled, with a type label by a recognizer plug-in. After the strings are annotated with a type label, application program modules may use the type label and other metadata to provide users with a choice of electronic commerce actions. If the user's computer does not have any actions associated with that type label, the user may be provided with the option to surf to a download Uniform Resource Locator (URL) and download action plug-ins for that type label.

In one embodiment, the present invention uses an Action-GUID to specify the class ids (CLSIDs) of the action plug-ins that may be used to provide actions for a particular semantic category type label. A GUID is a globally unique identifier used to represent components in the COM architecture. Each DLL has a class id (CLSID), which is a GUID. The Action-GUID is a GUID that is specified by the recognizer plug-in and which corresponds to the CLSID(s) of the only action plug-ins that should be permitted to provide actions for the semantic category type label provided by the recognizer plug-in.

These and other features, advantages, and aspects of the present invention may be more clearly understood and appreciated from a review of the following detailed description of the disclosed embodiments and by reference to the appended drawings and claims.

DETAILED DESCRIPTION

Figure 1:
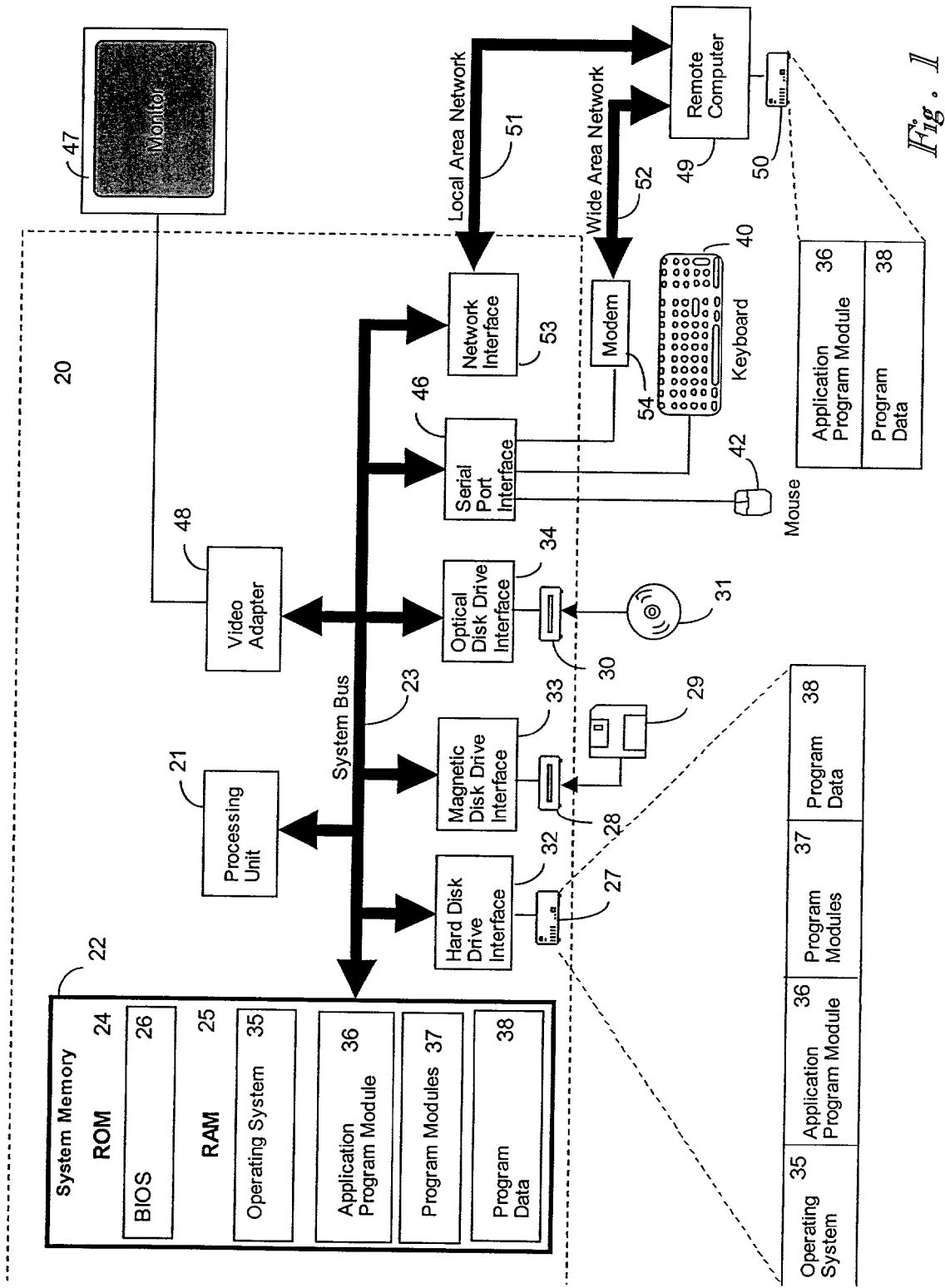
FIG. 1 is a block diagram of a computer that provides the exemplary operating environment for the present invention.

The present invention is associated with a method for semantically labeling strings in an electronic document and providing actions in association with those recognized strings. A string is defined as a data structure composed of a sequence of characters usually representing human-readable text. Strings are recognized and annotated, or labeled, with a type label by a recognizer plug-in. After the strings are annotated with a type label, application program modules may use the type label and other metadata to provide users with a choice of electronic commerce actions. If the user's computer does not have any actions associated with that type label, the user may be provided with the option to surf to a download Uniform Resource Locator (URL) and download action plug-ins for that type label.

In one embodiment, the present invention uses an Action-GUID to specify the class ids (CLSIDs) of the action plug-ins that may be used to provide actions for a particular semantic category type label. A GUID is a globally unique identifier used to represent components in the COM architecture. Each DLL has a class id (CLSID), which is a GUID. The Action-GUID is a GUID that is specified by the recognizer plug-in and which corresponds to the CLSID(s) of the only action plug-ins that should be permitted to provide actions for the semantic category type label provided by the recognizer plug-in.

Having briefly described an embodiment of the present invention, an exemplary operating environment for the present invention is described below.

Exemplary Operating Environment

Referring now to the drawings, in which like numerals represent like elements throughout the several figures, aspects of the present invention and the exemplary operating environment will be described.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, cell phones, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, a word processor program module 37 (or other type of program module), program data 38, and other program modules (not shown).

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
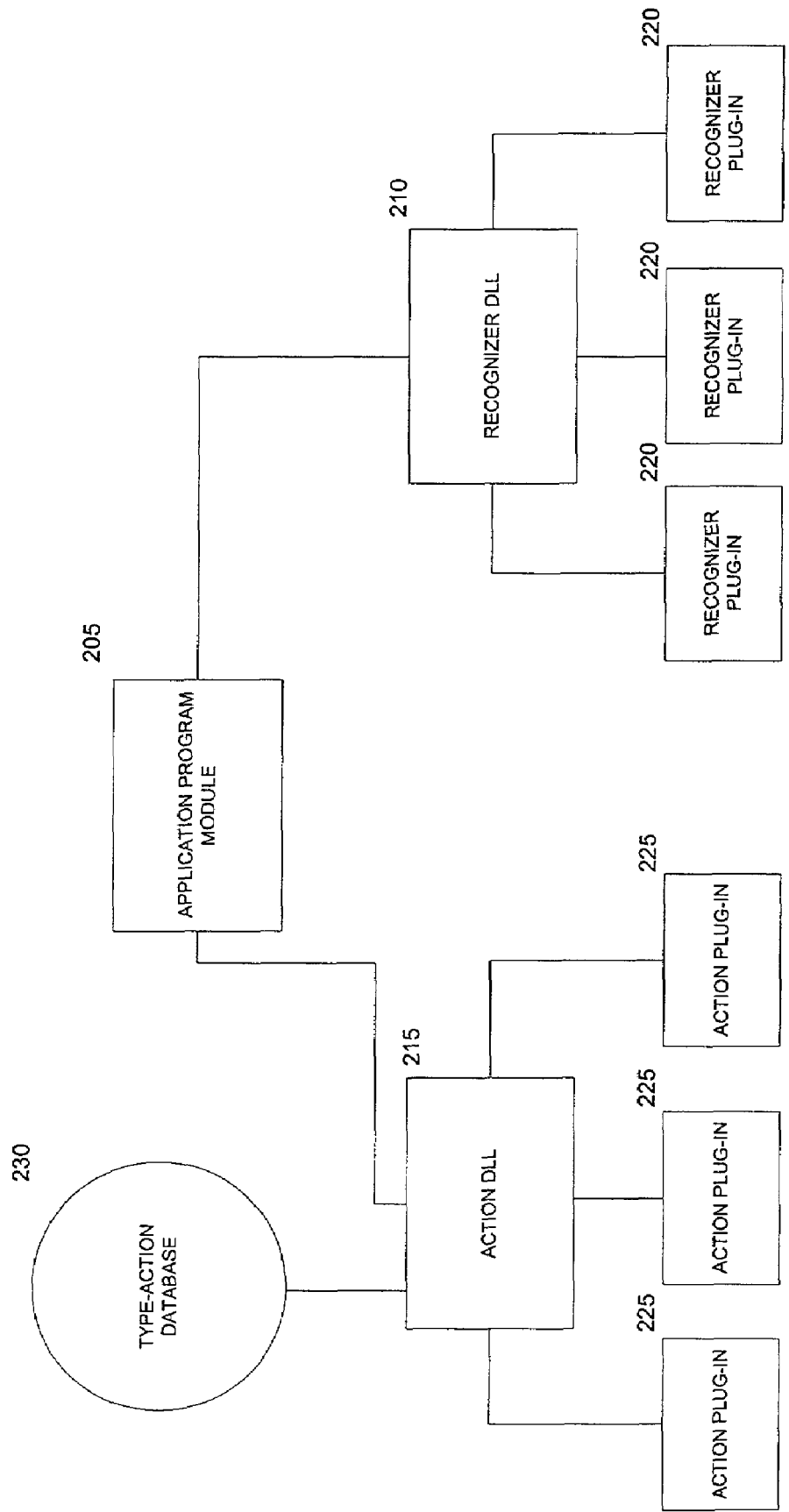
FIG. 2 is a block diagram illustrating an exemplary architecture for use in conjunction with an embodiment of the present invention.

FIG. 2 is a block diagram illustrating an exemplary architecture 200 for use in conjunction with an embodiment of the present invention. The architecture includes an application program module 205, such as word processor program module 37 (FIG. 1). The application program module 205 is able to communicate with a recognizer dynamic-link library 210 (hereinafter recognizer DLL) and an action dynamic-link library 215 (hereinafter action DLL) as a user is creating or editing an electronic document. The recognizer DLL 210 controls a number of recognizer plug-ins 220. The action DLL 215 controls a number of action plug-ins 225. The action DLL also controls a type-action database 230.

In a preferred embodiment, the action plug-ins and recognizer plug-ins are Automation Servers. Automation Servers are well-known software components which are assembled into programs or add functionality to existing programs running on the Microsoft WINDOWS® operating system. Automation Servers may be written in a variety of computing languages and may be un-plugged from a program at run time without having to recompile the program. It should also be understood that, in a preferred embodiment, the action DLL and recognizer DLL are merged into a single DLL.

The recognizer DLL 210 handles the distribution of strings from the electronic document running on the application program module 205 to the individual recognizer plug-ins 220. The recognizer plug-ins 220 recognize particular strings in an electronic document, such as a word processing document, a spreadsheet document, a web page, etc. The recognizer plug-ins 220 may be packaged with the application program module 205 or they may be written by third parties to recognize particular strings that are of interest. Typically, the recognizer DLL 210 passes strings to the recognizer plug-ins 220 in one paragraph or cell value increments.

As part of recognizing certain strings as including semantic information, the recognizer plug-ins 220 determine which strings are to be labeled and how they are to be labeled. After receiving these results from the various recognizer plug-ins 220, the recognizer DLL 210 sends semantic categories to the application program module. In a preferred embodiment, a semantic category comprises the recognized string, a type label, and a download URL. A semantic category may also comprise metadata. The recognizer plug-ins 220 each run separately and the recognizer DLL 210 is responsible for handling the asynchronicity that results from different recognizer plug-ins returning results with different delays.

After a string is labeled by a recognizer plug-in 220 and a semantic category is sent to the application program module 205, the user of the application program module 205 will be able to execute actions that are associated with the type label of the semantic category. The action DLL 215 manages the action plug-ins 225 that are run to execute the actions. As with the recognizer plug-ins 220, the action plug-ins 225 may be packaged with the application program module 205 or written by third parties to perform particular actions that are of interest to the third party. The action plug-ins provide possible actions to be presented to the user based upon the type label associated with the string. The action DLL 215 determines what type label the semantic category includes and cross-references the type label in the type-action database 230 with a list of actions to determine what actions to present to the user. It should be understood that, in a preferred embodiment, the type-action database is not used. Instead, the list of actions is dynamically generated for each type by looking in the registry to determine which actions are installed and then querying the action DLLs to determine which types they apply to.

After the user chooses an action, the action DLL 215 manages the appropriate action plug-ins 225 and passes the necessary information between the action plug-ins and the application program module 205 so that the action plug-in may execute the desired action. Typically, the application program module sends the action DLL an automation request to invoke the action the user has selected.

As described above, the combination of the recognized string, type label, metadata and download URL is referred to herein as a semantic category. The type label is a semantic information label. The semantic category may also comprise metadata, which are hidden properties of the semantic category. An example of a semantic category may clarify the definition. Suppose a user enters the text "Gone With the Wind" into an electronic document. The string "Gone With the Wind" may be identified as a semantic category of type label "Book Title" and of type label "Movie Title". In addition, metadata such as the ISBN number may be returned by the recognizer plug-in to the application program module as part of the semantic category. A download URL may be provided with the type labels "Book Title" and "Movie Title" in case the user's machine has not stored action plug-ins for these type labels. For example, an action for the type label "Book Title" may be "Buy this Book" from an online retailer. If the user does not have the action plug-in DLL 225 corresponding to "Buy this book", then the download URL may be used to navigate the user's web browser to an appropriate website to download this action plug-in. In other implementations of the invention, multiple download URLs may be provided for a single type label.

It should also be understood that the present invention, in a preferred embodiment, also recognizes sequences of capitalized words that contain function words, and which are likely to be special, but for which there is no type label information. These strings are typically labeled by a grammar checker program module.

The actions provided for a semantic category may utilize both the type label and the text of the recognized string. For example, a word processor program module may use a grammar checker as a recognizer plug-in to label strings that are person names. After a string has been labeled as a person's name, the word processor program module may, through a standard user interface mechanism, allow users to execute pertinent actions, such as looking up the person's name in the contacts folder in a personal information manager program module, sending electronic mail, or searching for the person's name in an HR database.

Having described an exemplary architecture, an exemplary method 300 for semantically labeling strings during document creation will be described below in reference to FIGS. 2 and 3.

Method for Semantically Labeling Strings During Document Creation

Figure 3:
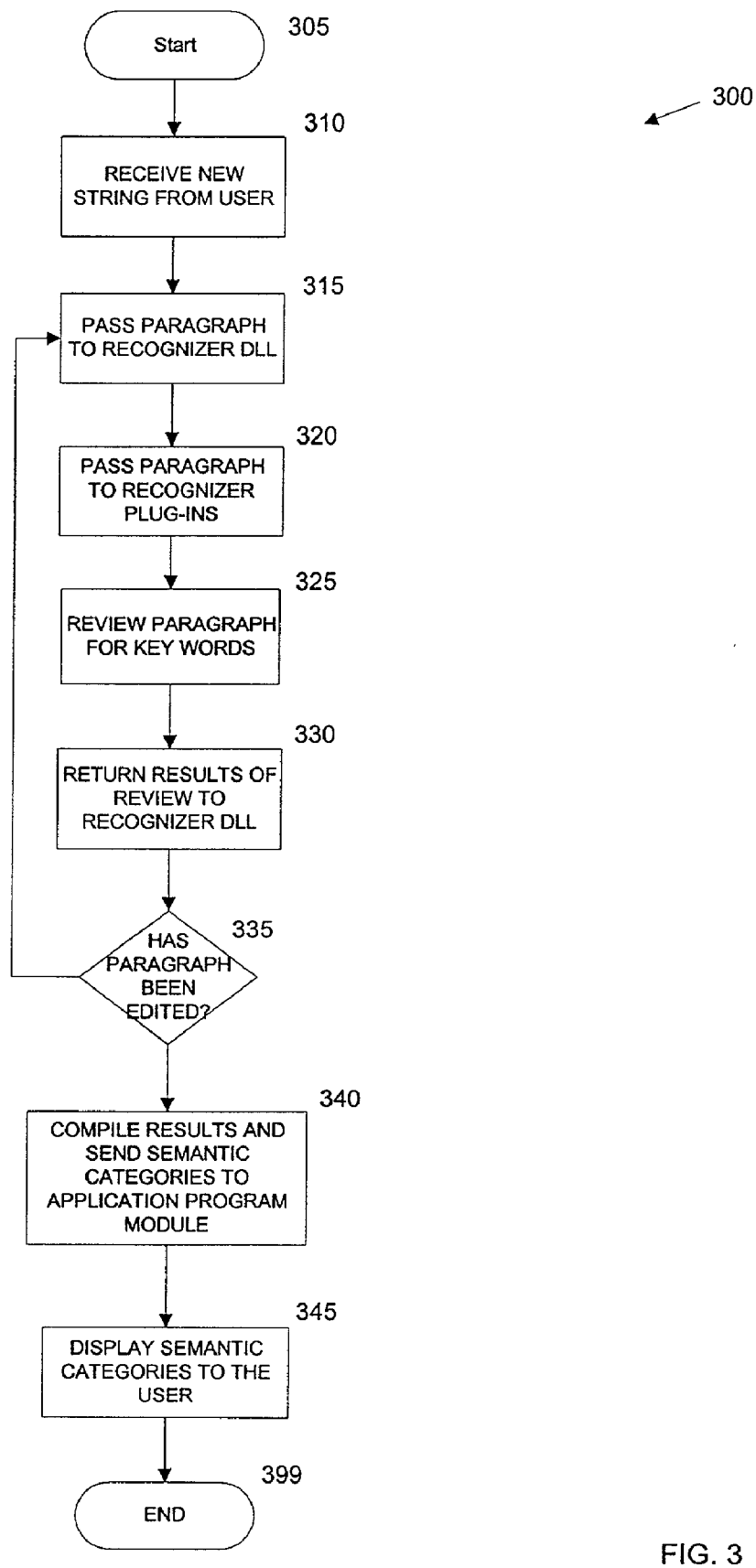
FIG. 3 is a flow chart illustrating a method for semantically labeling strings during creation of an electronic document.

FIG. 3 is a flow chart illustrating a method 300 for semantically labeling strings during creation of an electronic document. Those skilled in the art will appreciate that this is a computer-implemented process that is carried out by the computer in response to input from the user and instructions provided by a program module.

Referring to FIG. 3, the method 300 begins at start step 305 and proceeds to step 310 when a user opens an electronic document in application program module 205. In a preferred embodiment, the electronic document is a word processing document or a spreadsheet document. However, the invention is not limited to either of these specific types of electronic documents.

At step 310, the application program module 205 receives a new string, such as when the user enters a new paragraph into the electronic document or edits a previously entered paragraph. The method 300 then proceeds to step 315.

At step 315, the paragraph containing the new string is passed from the application program module 205 to the recognizer DLL 210. The recognizer DLL is responsible for communicating with the application program module, managing the jobs that need to be performed by the recognizer plug-ins, receiving results from the recognizer plug-ins and sending semantic category information to the application program module. At boot time, the recognizer DLL communicates with its recognizer plug-ins to determine what languages it supports, what types it can apply, etc. It should be understood that, in a preferred embodiment, a paragraph is passed to the recognizer DLL at step 315. However, in alternative embodiments, a sentence, the contents of a spreadsheet cell, a section of the document, the entire document, etc. may be passed to the recognizer DLL. In other words, the present invention is not limited to simply passing a paragraph to the recognizer DLL. The method 300 then proceeds to step 320.

Still referring to step 315, the application program module 205 typically sends one paragraph at a time to the recognizer DLL. In addition, in a preferred embodiment, a grammar checker program module sends all semantic categories (without type labels) to the recognizer DLL that have been identified by the grammar checker program module. Passing these semantic categories (without type labels) to the recognizer DLL is important because doing so saves each recognizer plug-in from needing to decide whether something is a capitalized string interspersed with function words (a task that would require writing a number of regular expressions: Cap Cap Unc Cap; Cap Unc Cap; etc.). If a label is applied by a recognizer plug-in to a string the grammar checker program module labeled, the grammar checker label will then be removed.

At step 320, during idle time, the paragraph (and information from the grammar checker program module) is passed to the recognizer plug-ins. The method then proceeds to step 325.

It should be understood that, in a preferred embodiment, the recognizer DLL 210 maintains a job queue. If before the recognizer DLL 210 sends the paragraph to the recognizer plug-ins 220 the user edits the paragraph, then the job containing the edited paragraph is deleted and is not sent to the recognizer plug-ins. Then, a new job enters the queue at step 315 after the edited paragraph is received at step 310. This job deletion is necessary to prevent the recognizer plug-ins from performing unnecessary work on a paragraph that has been edited.

At step 325, the recognizer plug-ins are executed on the paragraph to recognize keywords or perform other actions defined by the recognizer plug-in. As part of executing the recognizer plug-in, the paragraph may be broken into sentences by the recognizer plug-in. However, each recognizer plug-in is responsible for its own sentence-breaking. After the keywords or special words are found at step 325, then the method proceeds to step 330.

At step 330, the results from each of the recognizer plug-ins are received by the recognizer DLL. The method then proceeds to decision step 335.

At decision step 335, it is determined whether the paragraph that has been reviewed by the recognizer plug-ins has been edited after the paragraph was sent to the recognizer DLL. If so, then the method 300 returns to step 315 and the edited paragraph is received by the recognizer DLL from the application program module. If not, then the method proceeds to step 340.

At step 340, the results from the recognizer plug-ins are compiled into semantic categories by the recognizer DLL and the semantic categories are sent to the application program module. At step 345, the application program module displays the semantic categories to the user in the electronic document. The method 300 then ends at step 399.

As should be understood from the above description, the architecture for recognizing semantic categories permits third parties to develop recognizer plug-ins to identify strings of one or more particular types. The recognizer plug-ins communicate with the application program module and receive a string from the application program module. The recognizer plug-ins may apply recognition algorithms to the string and communicate the identity of recognized strings back to the application program module.

After a string is labeled with a particular type label, the user will be able to execute action plug-ins that pertain to that type label. The action plug-ins preferably are COM objects that are executed via communication between the application program module and the action DLL. Parameters and other information necessary to execute the action (the HTML of the string labeled as being of a particular type, the HTML of the string representing the current selection) will be passed from the application program module to the action DLL and, in turn, passed to the action plug-in.

Actions Assigned to Type Labels

An architecture for identifying and executing a set of actions associated with a semantic category may also be provided. This architecture comprises actions that apply to a particular type label (e.g. an action for book titles may be "Buy this book from shop.Microsoft.com") and executing those actions when the user so desires. An action is a user-initiated function applied to a typed string. For example, adding a name to the contacts folder is one action possible for a type label "Person name".

There is power and flexibility that results from allowing third party vendors, such as IT professionals, to design and write recognizer plug-ins and action plug-ins for deployment within an organization or for deployment on the World Wide Web. Some example actions that may be executed include:

Schedule a meeting
    Create task
    Display calendar
    Add to contacts folder
    Look up in contacts folder, address book, Windows Address Book (WAB), Global
    Address List (GAL), etc.
    Insert address into document
    Send mail to
    Display EXPEDIA map
    Stock quote lookup
    Send instant message to Different actions may be assigned to different type labels and these type label-action assignments may be stored in the type-action database 230. Table 1 below illustrates some possible type label-action pairings.

TABLE 1

| Type Labels | Actions |
| --- | --- |
| Person name | Show contact info |
| | Add to contacts |
| | E-mail |
| | Insert address into document |
| | Send instant message to |
| Date | Show calendar for that day |
| | New task with that due date |
| | Schedule meeting that day |
| Place | Display EXPEDIA map |
| | Add to contacts |
| Address | Add to contacts |
| Phone number | Add to contacts |
| E-mail | Add to contacts |
| Date | Schedule a meeting |
| Task | Schedule a task |
| Meeting | Schedule a meeting |

For each type label, the type-action database 230 may store a download URL specified by the creator of the type label that users who do not have action-plug-ins or recognizer plug-ins for that semantic category type can go to in order to get action plug-ins and/or recognizer plug-ins. For example, the download URL for the type label "Book Title" might be microsoft.com/semanticcategories.asp. Once at that web page, a user may be offered downloads of various action plug-ins and recognizer plug-ins. There may also be an option on the user interface to navigate to the download URL so that recipients of documents with semantic categories can easily get the action plug-ins for those semantic categories.

Storing Semantic Categories

Semantic categories may be stored as part of the electronic document along with other document information and may be available when a document is transmitted from one computer to another computer. In a preferred embodiment, storing semantic categories in an electronic document is controlled by an "Embed semantic categories" checkbox. The checkbox is on by default. Turning it off will prevent semantic categories in the document from being saved. The state of the checkbox is per document. The same checkbox controls saving for both .htm and .doc documents.

Checking a "Save semantic categories as XML properties" checkbox (off by default) will write out the text of all of the semantic categories in the document and their labels in the header of the HTML file in XML (that is using the same tags as are used inline, but surrounded by <xml>And </xml>) for easy identification and parsing by search engines and knowledge management systems.

Semantic categories may be saved as a unique namespace plus a tag name. A namespace is an XML construct for uniquely identifying a group of XML tags that belong to a logical category. Thus, every semantic category is uniquely identified by its nametag (e.g., "streetname") in addition to its namespace (e.g., "schemas-microsoft-com:outlook:contact")

Although the method 300 described above is one method for identifying semantic categories, there may be other mechanisms for identifying semantic categories. One mechanism is a grammar checker program module (not shown) connected to word processor program module 37. Another mechanism is receiving a semantic category from another electronic document. For example, when text containing a semantic category is copied from one electronic document and pasted into another electronic document of the word processor program module 37, the information identifying the semantic category is preserved and copied along with the copied text.

Displaying Semantic Categories to the User

Figure 4:
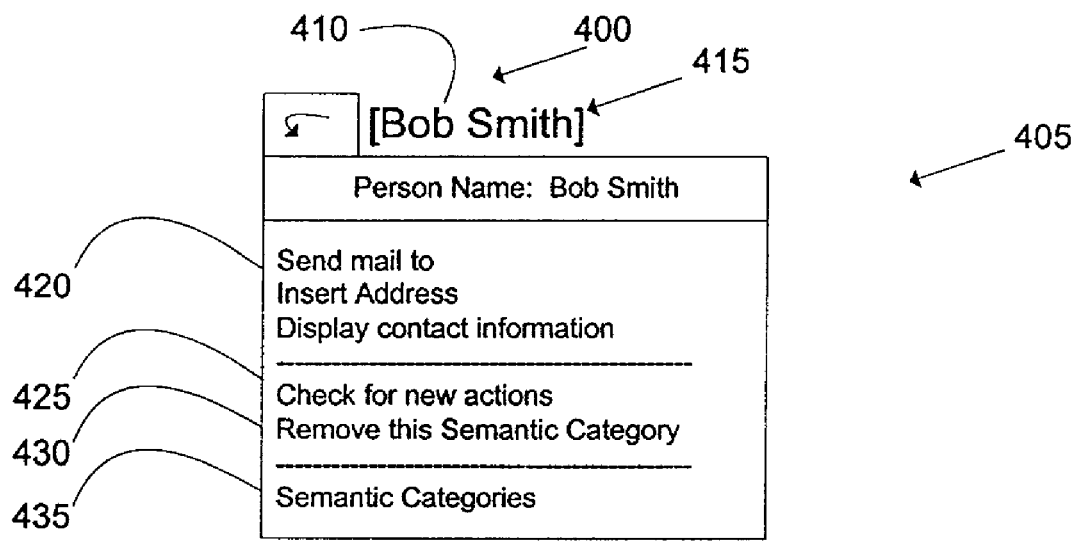
FIG. 4 is an illustration of a display of a semantic category and its associated dropdown menu.

Referring now to FIG. 4, an illustration of a display of a semantic category 400 and its associated dropdown menu 405 will be described. It should be understood that FIG. 4 is an illustration of a semantic category 400 and dropdown menu 405 as displayed to a user by the application program module 205.

The string 410 associated with semantic category 400 is the string "Bob Smith". As shown in FIG. 4, the string 410 of a semantic category 400 may be identified to the user by brackets 415. Of course, many other devices such as coloring, underlining, icons, etc. may be used to indicate to the user that a particular string is a semantic category.

In a preferred embodiment, when the user hovers a cursor over the string 410 or places the insertion point within string 410, then dropdown menu 405 is displayed to the user. The dropdown menu may display a list of actions associated with a semantic category. The dropdown menu may appear above and to the left of the semantic category string.

Typically, the first line of the dropdown menu indicates which string is the semantic category string (Bob Smith in FIG. 4) and what type the semantic category is (Person name in FIG. 4). Listed below the first line are actions 420 available for the semantic category type, such as "Send mail to . . . ", "Insert Address", and "Display contact information . . . ".

The first item on the drop down menu below the separator line is "Check for new actions . . . " 425. "Check for new actions . . . " 425 will appear only for semantic categories whose download URL is available to the application program module. If selected, "Check for new actions . . . " 425 uses the semantic category download URL to navigate the user's web browser to the homepage for the semantic category type applied to the string. For example, suppose new actions have been defined for the semantic category type "person name". If so, then new actions will be downloaded to the user's computer after selecting "Check for new actions . . . " 425. "Check for new actions . . . " 425 will be grayed out if a download URL is unavailable for the semantic category.

If selected, the "Remove this semantic category" item 430 deletes the semantic category label from the string. If selected, the "Semantic categories" item 435 navigates the user to the semantic categories tab of the autocorrect dialog.

It should be understood that the application program module sends a request to the action DLL to determine which actions are shown with each semantic category type.

Actions Performed in Association with Semantic Categories

There are a number of functions that users perform on typed data that preferred word processor program module 37 and semantic categories will make easier. The functions fall into three primary categories:

1) interacting with personal information manager contacts, tasks, meetings, and mail;
2) interacting with properties on the World Wide Web or a corporate intranet; and
3) interacting with other applications on the client machine.

A single string may be associated with multiple semantic categories. Every semantic category has a type label with one or more action plug-ins defined for the type label. For example, the "Address" type label may have the "Open in MapPoint", "Find with Expedia Maps" and "Add to my Address Book" actions associated with it and each of these actions may have a different action plug-in to execute the action.

The actions assigned to type labels also depend on the computer that the application program module is running on. Thus, if a computer has three actions registered for the type label "Address", then all strings with an "Address" type label will be assigned to three actions. However, if one of these semantic categories is sent to a computer which has only two actions registered for the "Address" type label, then the user will only be exposed to two actions for this semantic category.

Nesting of Semantic Categories

In an embodiment of the present invention, semantic categories may be nested inside each other. For example, the string "George Washington" may include a semantic category with type label "Person Name" for the span "George Washington State" and a semantic category with type label "State" for the span "Washington". Moreover, two semantic categories may cover exactly the same span. For example, the string "George Washington" may include a semantic category with type label "Person Name" and a semantic category with type label "President".

Because the preferred application program module 37 will support labeling a single string with multiple type labels (e.g. Bob Smith could be a semantic category labeled as a "Person Name" and labeled as a "Microsoft employee"), the preferred application program module 37 will use cascade menus on the dropdown menu if multiple semantic category types are assigned.

For example, the cascade menu may include a list of the type labels included in the recognized string. This list may include a type label "Person Name" and a type label "Microsoft employee".

It should be understood that a cascade menu may be used to allow the user to select which type label the user is interested in and to further select an action after selecting the type label.

In-document User Interface to Indicate Semantic Categories

As described above with reference to FIG. 4, the application program module may include the option to display an in-document user interface to indicate the location of semantic categories. This in-document user interface may use a colored indication to indicate the location of a semantic category, such as the brackets 415 in FIG. 4. The in-document user interface will also be able to show nesting of semantic categories. For example, if Michael Jordan is labeled as a semantic category with type label "Person Name", Michael is a semantic category with type label "First Name" and Jordan is a semantic category with type label "Last Name", the document may look like this with the brackets indicating semantic categories:

[[Michael] [Jordan]]

Of course, the in-document user interface may be any sort of indication. For example, in the "EXCEL" spreadsheet application program, the interface comprises a triangle in the lower right hand portion of a cell to indicate that one or more semantic categories are present in the cell.

Although the present invention has been described as implemented in a word processing program module, it should be understood that the present invention may be implemented in other program modules, including, but not limited to, HTML authoring programs and programs such as the "POWERPOINT"® presentation graphics program and the "OFFICE" program module, both marketed by Microsoft Corporation of Redmond, Wash.

As described above, the semantic category may also include metadata returned by the recognizer plug-ins. For example, a recognizer plug-in that recognizes the titles of books may return as metadata an ISDN book number when it recognizes the title of a book. The ISDN book number metadata may then be used to provide actions. Metadata may also be used to disambiguate for actions and searches. For example, suppose a recognizer DLL is linked to a corporate employee database to recognize names. When the recognizer DLL recognizes "Bob Smith", it may store "employee ID=12345" as metadata in the background. Then, when an action is fired, the text in question will be known to reference Bob Smith, employee no. 12345 rather than Bob Smith, employee no. 45678. Also, the metadata may allow searches to be performed independent of the actual text in a document. So, a search may be conducted on "Robert Smith" by looking for employee 12345 in the employee databases and by performing a search on the metadata for employee number 12345 to find documents with "Bob Smith" in them. There are also numerous other functions for metadata. For instance, DHTML could be inserted so special tricks may be performed within a web browser. Additionally, data used by other actions may be inserted such as someone's e-mail address that could be used by the send-mail-to action, a normalized version of the date could be stored to easily interact with a personal information manager, etc.

Restricting Actions for Certain Semantic Categories

In some embodiments, the semantic category architecture as illustrated in FIG. 2 allows any action plug-in to declare that it provides actions for any recognizer plug-in (or any type label recognized by any recognizer plug-in). This architecture allows great flexibility in that action plug-ins can be developed separately from recognizer plug-ins and third parties can extend the semantic category type labels recognized. However, this architecture has some drawbacks. For example, suppose that a developer invests heavily in building and maintaining a database of product names of a particular type, such as a list of compact discs, and invests in developing a recognizer plug-in to recognize these product names. The developer may want to leverage this database by recognizing compact discs mentioned in documents and mail messages in order to sell those items to users. However, under the semantic category architecture described above, the recognition by the developer's recognizer plug-in may be used by a third party to provide actions such as purchasing the compact disc from a third party. Thus, the third party or another compact disc retailer could effectively "hijack" the recognition efforts of the developer's recognizer plug-in and provide a buying action for compact discs recognized by the developer's recognizer plug-in. The third party simply has to develop an action plug-in and use the existing recognizer plug-in of the developer. Developers might be hesitant to spend a lot of time and resources developing effective recognizer plug-ins if it is easy for their competitors to capitalize on their efforts. Thus, a method and system for specifying which actions plug-ins may be used in association with a specific recognizer plug-in is needed.

In one embodiment, the present invention uses an ActionGUID to specify the class ids (CLSIDs) of the action plug-ins that may be used to provide actions for a particular semantic category type label. A GUID is a globally unique identifier used to represent components in the COM architecture. Each action plug-in has a class id (CLSID), which is a GUID. The ActionGUID is a GUID that is specified by the recognizer plug-in and which corresponds to the CLSID(s) of the only action plug-ins that should be permitted to provide actions for the semantic category type label provided by the recognizer plug-in.

Thus, in one embodiment of the present invention, a recognizer plug-in is able to specify one or more ActionGULIDs that identify the one or more action plug-ins that should provide actions for a particular type label supplied by the recognizer plug-in. The ActionGUID may be stored within a document so that even if the document travels to a different machine, the ActionGUID will be obeyed (note that CLSIDs are typically not specific to a particular machine, but are constant for a particular plug-in or DLL).

With ActionGUID support added, in one embodiment, the present invention will provide a list of actions in the semantic category dropdown menu for the action plug-in(s) whose CLSID(s) matches the ActionGUID.

One key aspect of recognizers is that in addition to applying category information to a string, they can also associate arbitrary metadata with that string. For example, the recognizer for person names might also embed the person's employee id number in the document. The benefit of embedding additional metadata is that the pool of metadata is available to the action handlers. So, for example, an action handler to send someone e-mail might most easily be written in some environments if the employee id number were embedded along with the name, assuming that employee e-mail addresses were derived from employee numbers. In one embodiment of the invention, the ActionGUID may be embedded in the metadata and stored with the recognized string.

Figure 5:
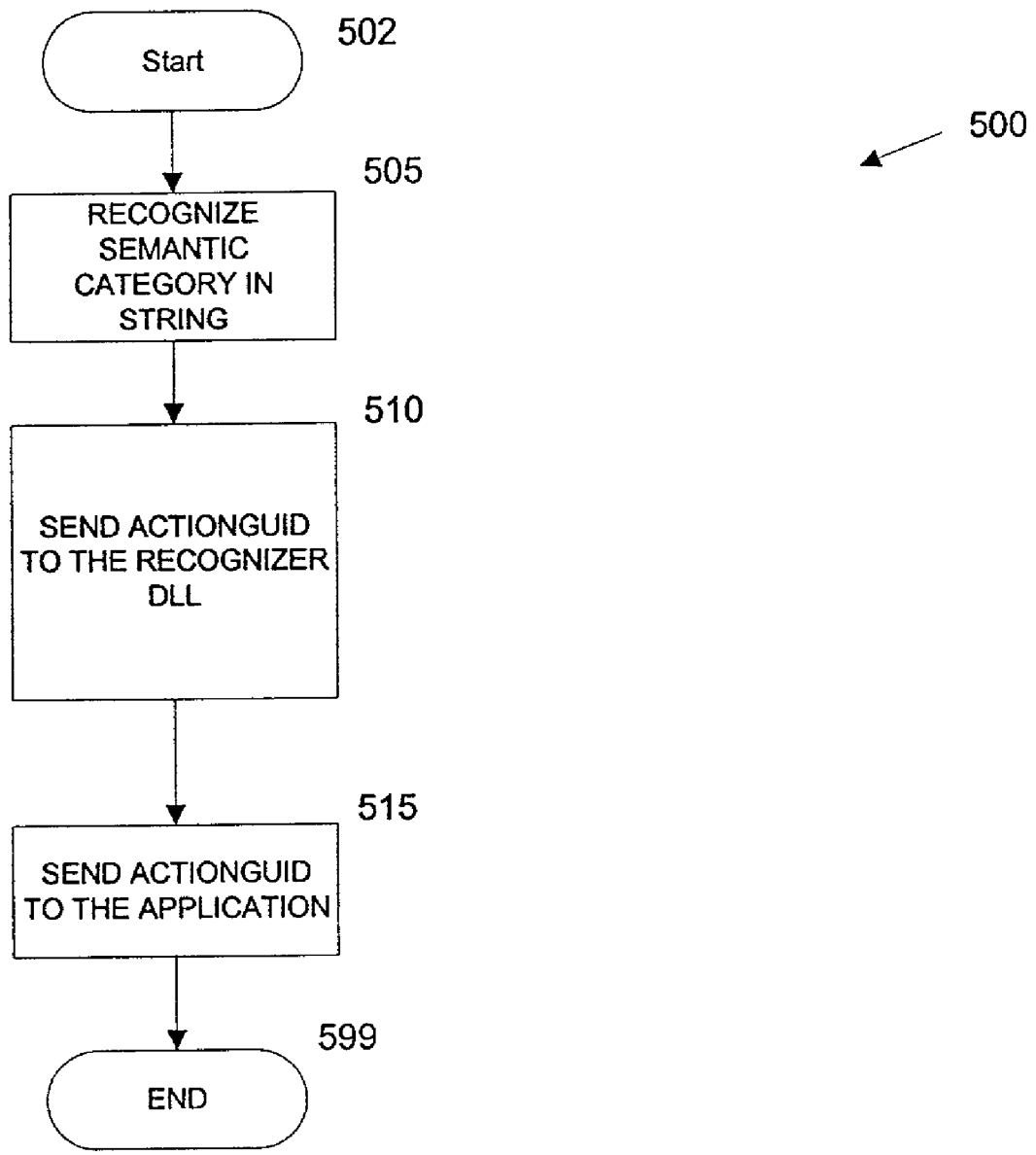
FIG. 5 is a flow chart illustrating a method for specifying particular action plug-ins to use with a particular semantic category in accordance with an embodiment of the present invention.

Referring now to FIG. 5, a flow chart illustrating a method 500 for specifying particular action plug-ins to use with a particular semantic category in accordance with an embodiment of the present invention will be described.

The method begins at start step 502 and proceeds to step 505 where a recognizer plug-in recognizes a semantic category in a string that has been passed from the recognizer DLL. The method then proceeds to step 510.

At step 510, the recognizer plug-in passes semantic category information to the recognizer DLL such as the string that was recognized, the type label to be applied to the string, the download URL, etc. Included in this semantic category information is one or more ActionGUIDs. The ActionGUIDs identify the one or more action plug-ins that should provide actions for the particular type label supplied by the recognizer plug-in.

The method then proceeds to step 515. At step 515, the semantic category information (including the ActionGUID) is passed from the recognizer DLL to the application and stored with the document. The method then ends at step 599.

After the ActionGUID is stored with the document, the ActionGUID may later be used if the user decides to view the possible actions associated with a semantic category as will be described below.

Figure 6:
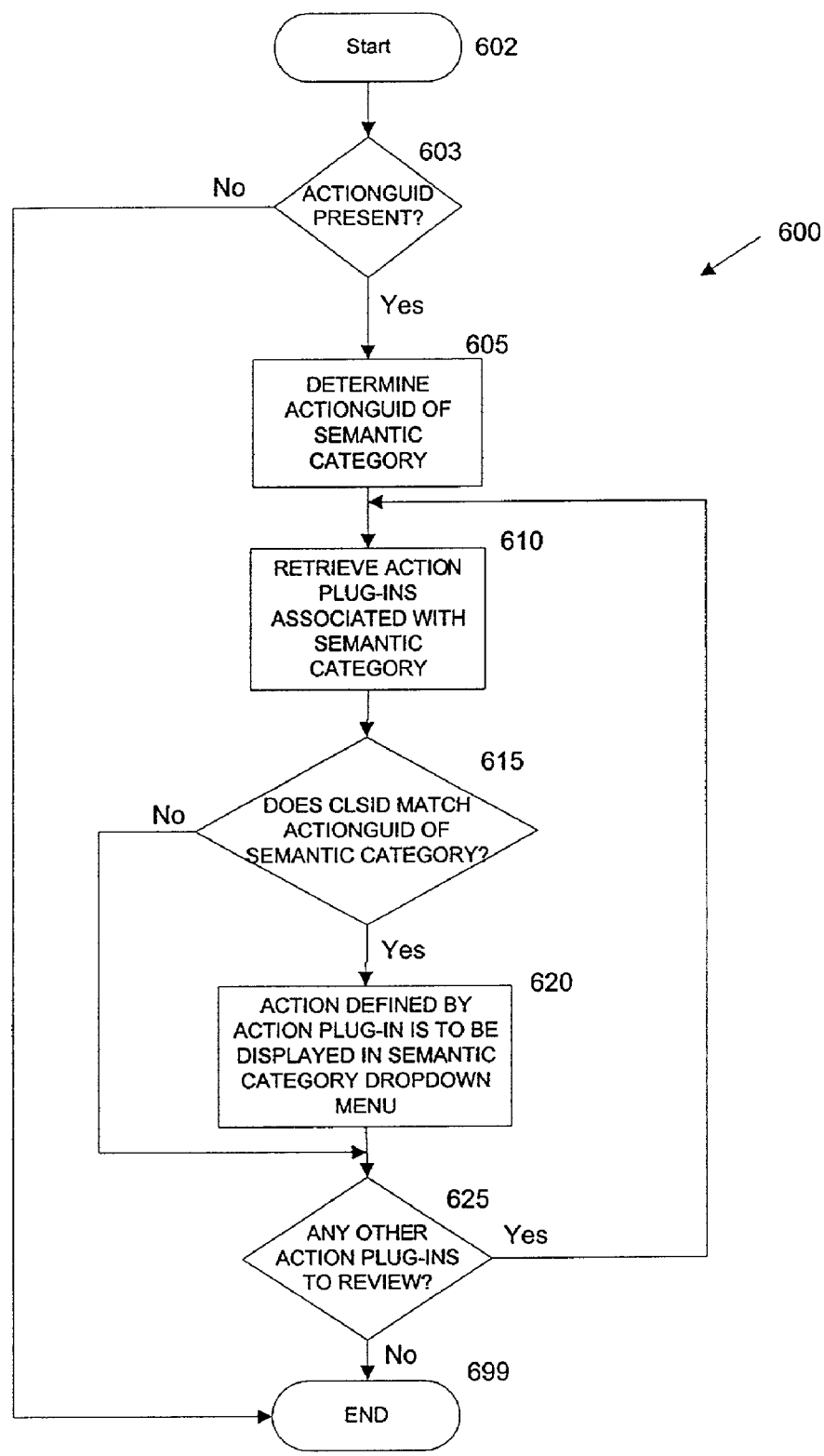
FIG. 6 is a flow chart illustrating a method for displaying actions for a particular semantic category in accordance with an embodiment of the present invention.

Referring now to FIG. 6, a flow chart illustrating a method 600 for displaying actions for a particular semantic category in accordance with an embodiment of the present invention will be described. The method 600 begins at start step 602 and proceeds to decision step 603 when it is determined that the user has selected to view the actions associated with a particular semantic category type label. At decision step 603, it is determined whether there is an ActionGUID associated with the semantic category type label. If not, the method ends at step 699 because no ActionGUID is present and actions are not restricted. However, if an ActionGUID is present, then the method proceeds to step 605.

At step 605, the ActionGUID associated with the selected semantic category type label is determined. The method then proceeds to step 610.

At step 610, one of the action plug-ins that specifies to provide actions for that particular semantic category type label is reviewed and its CLSID is retrieved. It should be understood that, in one embodiment of the invention, any number of action plug-ins may designate that they provide actions for any number of semantic category labels and the recognizer plug-in developer must specifically designate which action plug-ins are authorized action plug-ins using an ActionGUID. Therefore, at step 610 one of the action plug-ins that specifies to provide actions for that particular semantic category type label is retrieved and its CLSID is retrieved so that it may be determined whether the action plug-in is an authorized action plug-in as will be described below.

At decision step 615, it is determined whether the CLSID of the retrieved action plug-in matches the ActionGUID of the semantic category. If not, then the method proceeds to decision step 625. If the CLSID does match the ActionGUID of the semantic category, then the method proceeds to step 620.

At step 620, the action defined by the action plug-in will be displayed in the semantic category dropdown menu as illustrated in FIG. 4. The method then proceeds to decision step 625.

At decision step 625, it is determined whether there are any other action plug-ins that specify to provide actions for the particular semantic category type label and which have not been reviewed. If so, then the method returns to step 610 and another action plug-in is reviewed. If not, then the method ends at step 699 and the semantic category dropdown menu is displayed to the user with the authorized actions displayed.

It should be understood that there are a number of ways to designate that one or more action plug-ins are to be used with a particular semantic category type label. For example, in one embodiment of the invention, a recognizer plug-in may designate which action plug-ins are to be used to provide actions during an initialization process. During the initialization process the recognizer plug-in may send an API to the recognizer DLL including relevant information about the recognizer plug-in such as the locales the recognizer applies to, the applications that the recognizer plug-in applies to, etc. Included with this initialization information may be an ActionGUID value. If no ActionGULID is specified, then anyone can provide an action for the semantic category type label recognized by the recognizer plug-in. However, if an ActionGULID is specified, then this ActionGUID is compared to CLSIDs of action plug-ins to determine which action plug-ins may provide actions.

In one embodiment, the information regarding which action plug-ins may provide actions may be stored in the type-action database.

In another embodiment, the files for a web page may include the ActionGUID so that only specific action plug-ins may be used to provide actions. The web page may contain some XML that specifies some information about the semantic categories on the web page (such as what type the semantic categories are, what the download URL is, etc.). This information may be augmented to include an actionGUID. The infrastructure of the present invention may be used to discover the actionGUID when it parses the relevant parts of the web page and may restrict the actions for the semantic categories accordingly.

In another embodiment, a web page may be designed so that an HTML tag specifies not to use specific recognizer plug-ins and action plug-ins while viewing a particular site. In one embodiment of the invention, this would be a voluntary program similar to the ROBOT exclusion standard used to prevent web search engines from crawling web content whose owner has specifically requested that their web content not be crawled. Thus, when a specific predefined HTML tag is encountered on another's webpage, no recognizer plug-ins and action plug-ins would be used or only specified action plug-ins and recognizer plug-ins would be used. This prevents the situation where bookseller one has a webpage and, while viewing bookseller one's webpage, a user is presented with semantic category recognition and actions provided by bookseller two's recognizer plug-in and action plug-in.

Although the present invention has been described above as implemented in preferred embodiments, it will be understood that alternative embodiments will become apparent to those skilled in the art to which the present invention pertains without departing from its spirit and scope. Accordingly, the scope of the present invention is defined by the appended claims rather than the foregoing description.

What is claimed is:

1. A computer-implemented method, implemented in an electronic system for creating and editing an electronic document, for providing a plurality of actions in association with a string in the electronic document, the method comprising:

receiving an automatically selected string in the electronic document;

recognizing the string as belonging to at least one semantic category;

when the string belongs to more than one semantic category, labeling the recognized string with a plurality of type labels associated with the plurality of semantic categories, wherein labeling the recognized string with the type label associated with the plurality of semantic categories comprises receiving a selection, from a menu, the selection labeling the recognized string with a type label from the plurality of type labels when the recognized string is associated with a plurality of semantic categories;

determining an action ID associated with the type label of the at least one semantic category associated with the type label selected from the menu;

determining whether a plurality of action plug-ins associated with the at least one semantic category are available in the electronic system using the type label and metadata associated with the electronic document;

when the plurality of action plug-ins are associated with the at least one semantic category, then for each of the plurality of action plug-ins, determining whether a class ID matches the action ID and then displaying unique elements associated with the at least one semantic category for the matching action plug-in in a semantic category menu, wherein displaying the unique elements associated with the at least one semantic category for the matching action plug-in in the semantic category menu comprises:

displaying the recognized string and one or more types of semantic categories associated with the recognized string, displaying a list of unique actions available for each of the at least one semantic category type, displaying an action to navigate a user's web browser to download new actions, in response to a determining that a download uniform resource locator (URL) is available, and displaying an action to delete at least one type of semantic category; and embedding the plurality of semantic categories in the electronic document, wherein each of the plurality of embedded semantic categories comprises the automatically selected string in the electronic document, the label associated with the recognized string, and the unique action associated with the at least one semantic category for the matching action plug-in.

2. The method of claim 1 further comprising:
determining that the action has been selected and performing the action defined by the action plug-in on the electronic document.

3. The method of claim 1 wherein the semantic category menu is displayed in response to a user selecting the at least one semantic category.

4. The method of claim 1 further comprising:
if the plurality of action plug-ins are not associated with the at least one semantic category, then providing a hypertext link to download action plug-ins associated with the at least one semantic category.

5. A system operable for creating and editing an electronic document, the system comprising:
a memory storage; and
a processing unit coupled to the memory storage, wherein the processing unit is operative to:
receiving an automatically selected string in the electronic document;
recognizing the string as belonging to at least one semantic category;
when the string belongs to more than one semantic category, labeling the recognized string with a plurality of type labels associated with the plurality of semantic categories, wherein labeling the recognized string with the type label associated with the plurality of semantic categories comprises receiving a selection, from a menu, the selection labeling the recognized string with a type label from the plurality of type labels when the recognized string is associated with a plurality of semantic categories;
determining an action ID associated with the type label of the at least one semantic category associated with the type label selected from the menu;
determining whether a plurality of action plug-ins associated with the at least one semantic category are available in the electronic system using the type label and metadata associated with the electronic document;
when the plurality of action plug-ins are associated with the at least one semantic category, then for each of the plurality of action plug-ins, determining whether a class ID matches the action ID and then displaying unique elements associated with the at least one semantic category for the matching action plug-in in a semantic category menu, wherein displaying the unique elements associated with the at least one semantic category for the matching action plug-in in the semantic category menu comprises:
displaying the recognized string and one or more types of semantic categories associated with the recognized string,
displaying a list of unique actions available for each of the at least one semantic category type,
displaying an action to navigate a user's web browser to download new actions, in response to a determining that a download uniform resource locator (URL) is available, and
displaying an action to delete at least one type of semantic category; and
embedding the plurality of semantic categories in the electronic document,
wherein each of the plurality of embedded semantic categories comprises the automatically selected string in the electronic document, the label associated with the recognized string, and the unique action associated with the at least one semantic category for the matching action plug-in.

6. The system of claim 5 wherein the processing unit is further operable to determine that the action has been selected and perform the action defined by the action plug-in on the electronic document.

7. The system of claim 5 wherein the semantic category menu is displayed in response to a user selected semantic category.

8. The system of claim 5 wherein if the plurality of action plug-ins are not associated with the at least one semantic category, the processing unit is further operable to then provide a hypertext link to download action plug-ins associated with the at least one semantic category.

9. The system of claim 5 wherein the processing unit is further operable to determine a class ID for the action plug-in associated with the at least one semantic category.

10. The system of claim 5 wherein the processing unit operable to determine the action ID associated with the type label of the at least one semantic category comprises the processing unit operable to receive the action ID from a recognizer plug-in associated with the at least one semantic category.

11. The system of claim 5 wherein the processing unit operable to determine the action ID associated with the type label of the at least one semantic category comprises the processing unit operable to search a database for the action ID associated with the at least one semantic category.

* * * * *